United States Patent [19]
Mandel et al.

[11] Patent Number: 5,823,529
[45] Date of Patent: Oct. 20, 1998

[54] SINGLE STACK HEIGHT SENSOR FOR PLURAL SHEET STACKING BINS SYSTEM

[75] Inventors: Barry P. Mandel, Fairport; John W. Daughton; Charles D. Rizzolo, both of Rochester; John D. Hower, Jr., Fairport; Don S. Walker, Rochester, all of N.Y.

[73] Assignee: Xerox Corporation, Stamford, Conn.

[21] Appl. No.: 585,027

[22] Filed: Jan. 11, 1996

Related U.S. Application Data

[60] Provisional application No. 60/004,825 Oct. 5, 1995.

[51] Int. Cl.$^6$ .................................................. B65H 39/10
[52] U.S. Cl. .......................... 271/296; 271/298; 271/176
[58] Field of Search .................................. 271/296, 298, 271/279, 176, 207, 220; 270/58.07, 58.08, 58.14, 58.18, 52.03, 52.06

[56] References Cited

U.S. PATENT DOCUMENTS

| | | | |
|---|---|---|---|
| 5,017,972 | 5/1991 | Daughton et al. | 355/321 |
| 5,033,731 | 7/1991 | Looney | 271/176 |
| 5,328,169 | 7/1994 | Mandel | 271/290 |
| 5,464,201 | 11/1995 | Deen | 270/53 |
| 5,547,178 | 8/1996 | Costello | 270/52.02 |
| 5,551,686 | 9/1996 | Sanchez et al. | 271/298 |

*Primary Examiner*—David H. Bollinger

[57] ABSTRACT

In a sheet stacking system with an array of plural sheet stacking bins with sheet entrances for stacking plural flimsy print substrate sheets from a printed sheets output path into selected bins, with a sheet feeding input path system for feeding selected sheets into a selected bin to be stacked therein, with a bin fullness indicator system for indicating that the estimated height of the stack has reached a preset allowable maximum, and a stacking control system controlled by the bin fullness indicator system to control the sheet feeding input path; there is a single stack height sensing system including a stack height sensor for respective measurements of the actual stack height of the stack of sheets in respective bins for the bin fullness indicator system, a movable carriage system for moving this single stack height sensing system from adjacent to one bin to adjacent another bin for respective measurements, the stack height sensor including a movable sensing element extendable by an intermittent actuator into the bin then adjacent to the movable carriage system to detect the stack height therein. A signal generator is responsive to the sensing element position to provide control signals to the stacking control system.

17 Claims, 8 Drawing Sheets

SINGLE STACK HEIGHT SENSOR FOR PLURAL SHEET STACKING BINS SYSTEM

Priority is claimed from a U.S. Provisional application Ser. No. 60/004,825 filed Oct. 5, 1995 by the same inventors and assignee.

Cross-reference and incorporation by reference is made to the following copending and commonly assigned applications: one filed Feb. 23, 1995, as U.S. application Ser. No. 08/393,604, by Hector J. Sanchez, et al, entitled "Printing and Mailbox System For Shared Users With Bins Almost Full Sensing", Ser. No. 08/393,604, now U.S. Pat. No. 5,551,686; another filed Feb. 23, 1995, as U.S. application Ser. No. 08/393,605, by Mark Costello, entitled "Printer Mailbox Split Jobs Overflow Banner Sheet Indicator System", now U.S. Pat. No. 5,547,178; and three others contemporaneously filed herewith, with specifications similar in part to this application, at least one inventor in common, and Ser. Nos. 08/585,079, 08/585,031 and 08/585,081, now U.S. Pat. Nos. 5,603,492; 5,609,333; and 5,599,009.

The present invention relates to an improved sheet stacking height estimation or measurement system, for sheet stacking trays or bins, which may be part of a bin or tray fullness determination or control system. It is further disclosed here as incorporated into a shared users printer mailbox bin full determination system, for which it provides particular advantages.

The above-cited copending applications address problems in the art or are otherwise of interest as to printer "mailbox" systems. Further incorporated descriptions of functions, advantages and problems of printer "mailboxes" in general, mailbox bin assignment systems, bin locking and access systems, and other hardware examples, some of which are similar to or in addition to those illustrated herein, are shown or described in Xerox Corp. U.S. Pat. No. 5,370,384 issued Dec. 6, 1994 to Romanowski, U.S. Pat. No. 5,358,238 issued Oct. 25, 1994 to Mandel, et al, and U.S. Pat. No. 5,328,169 issued Jul. 12, 1994 or U.S. Pat. No. 5,382,012 issued Jan. 17, 1995 to Mandel, et al. Other mailbox and sorter or collator art is cited therein. General features of printing and mailboxing systems for shared users, including exemplary bin empty or bin in use sensors, and their needs and reasons, are also taught and explained in detail in said above-cited Xerox Corporation U.S. Pat. No. 5,328,169, and related specifications, such as U.S. Pat. No. 5,358,238, and thus need not be described in detail herein. The presently disclosed system and embodiments and its "bin full" and "bin almost full" status and control signals are compatible and combinable with said mailbox "bin empty" (or "bin not empty") signals and their functions and operations as disclosed in said prior patents.

A mailboxing system is a system for print jobs separations by users, not by pages. Thus, in a mailbox system, unlike a sorter or collator, the number of sheets placed in any one mailbox bin of the array of bins at any one time may vary greatly from the contents of other bins at that time. Plural precollated sets of stapled or unstapled sheets may be placed in individual bins, and bins are not normally filled sequentially. In contrast, a sorter or collator system is for postcollation of the plural pages of plural sets of a printjob, normally by placing one identical sheet of each page of the print job sequentially in each bin one at a time until one identical job set is collated in each bin. With mailboxing systems, shared printer users or print job recipients do not normally need to manually separate their print jobs from a common output stack of print jobs of others, or stand by printers awaiting outputs to avoid their print jobs being commingled with print jobs of other users, or read or accidentally taken away by other users. Yet, for a mailbox system which is compact, yet provides a sufficient number of mailboxes for a sufficient number of shared users, the sheet capacity or sheet stacking height of each mailbox bin or tray must be relatively limited. A further complication in this respect is that there are certain situations in which it may be desirable for part of a users jobs to be sent to one or more assigned mailbox bins, especially for documents desired to be secured in locked or access restricted bins, but for other jobs to be sent to a common shared open or overflow tray or elevator stacking tray.

Furthermore, there are other situations in which customers may desire the use and/or unloading of mailbox bins to be shared by more than one user, such as by assignment of a common mailbox address and/or password for a team or group and/or secretaries by the system administrator or users. Providing this sharing of individual mailboxes, which can be provided for the entire mailbox unit or just certain bins, introduces additional issues and problems. For example, any such sharing user accessing a bin can be required (instructed) to remove all sheets in the bin, or can be allowed to remove just their own individual print jobs, leaving others in the bin. The former may not actually be done in practice all the time, thus also leaving only a partially unloaded bin. The latter does not ever allow an assumption that the accessed bin has been fully emptied every time it is accessed. In either case, sharing a mailbox bin makes it much more difficult and unreliable to guess or make assumptions as to the remaining stacking space available in a bin from the sheets that were fed into the bin before it was accessed.

Thus, effective mailbox systems for separating by different and/or shared users the print jobs of printed sheets outputted by a shared user printer into respective limited sheet capacity bins of a plural bin physical "mailbox" print job distribution system have special needs or difficulties. As will be further discussed below, one of these is to provide an improved system of more accurately sensing and signaling the individual mailbox bins reaching, or about to reach, their above noted limited sheet capacity or maximum stack height. That mailbox bin fullness signal information can then be used to control the print job distribution operation in accordance therewith, such as by generating automatic controls for rerouting printed sheets to different bins, or to an elevator stacking tray, or to a common overflow bin or tray. Better bin fullness determinations allows better maximization of bins usage and bins availability, by better determining when, and to what extent, more sheet stacking room is actually available in a given bin. It can provide more and/or better control options for the system controller, users or systems administrators to better select where to send or direct print jobs, for increased productivity and maximizing utilization of the printer output and mailbox system, reducing printing stoppages of the reproduction apparatus, and/or reducing the required number of mailbox bins.

By way of background as to printer mailbox bin content sensors and systems, the above-cited U.S. Pat. No. 5,328,169 issued Jul. 12, 1994 to Barry P. Mandel teaches, inter alia, a mailbox system "bin empty" (or not empty) sensors system and its use in a system for automatically rerouting print jobs to mailbox bins that are or become fully empty and thus can be refilled and/or reassigned. It also describes some controls based on counting the number of sheets of a print job sent to be printed or being printed in the printer and/or inputted into a mailbox bin for a particular user. This patent also discusses problems caused by the fact that in order to provide overall compactness of a printer mailbox unit, the sheet stacking capacity of most of the individual mailbox bins thereof must be fairly limited (as few as 50 normal sheets per mailbox bin, for example). Thus, large multisheet print jobs or large numbers of sets of plural print jobs for a particular user will normally not all fit at once into one mailbox bin, without the removal of prior print jobs from that bin.

However, such a mailbox bin empty sensing system does not have the same difficulties as a mailbox bin full or almost full sensing and control system. The latter has the partial job removal problem noted above, plus additional problems. Some of these are general problems, in various other sheet stacking trays or bins, not limited just to mailbox bins. One problem for a bin full or almost full or further sheet stacking capacity sensing and control system for a mailbox or other sheet stacking tray is that the stack height, and thus the remaining bin sheet stacking capacity, cannot be estimated or measured exactly in bin directed sheet counts (the sheet input count from the printer for sheets directed to that bin, or a bin sheet entrance sensor count). That is because the actual and maximum stacking height in the bin can vary considerably with different print job factors. For example, with variations in the sheet thickness, humidity, sheet curl, staples or other binding, edge climbing by sheet edges partially hanging up on vertical registration edges, and other factors affecting stack height. Especially, the maximum stack height, which may occur only in certain areas of the stack, and be considerably higher than the rest of the stack. That is, the stack height measured at one point on the stack, or even the average stack height, may be considerably lower than the stack height measured at another area of the stack.

The maximum or peak stack height is much more relevant for estimating the usable remaining stacking or sheet input capacity of a tray or bin, or where the sheet input level should be relative to the stack height. That is especially true if the maximum stack height occurs in the input path of incoming further sheets to be stacked, where it can obstruct that input path. The maximum stack height in a tray or bin is especially affected by sets stapling. Stacks of plural stapled sets tend to have a much higher height level where the staples overly or overlap on top of one another in the stack, since the staples also add to the set thickness. This is sometimes referred to as "staple buildup". Since staples are normally applied in a preset line adjacent the edges or corners of job sets, that is where the staple buildup typically occurs. Staple buildup is particularly pronounced for small sets of only a few sheets per stapled set. It has been found for example that a stack of multiple sets of only two sheets per stapled set, such as a common two page letter, can have a maximum stack height in the area of the stack where all those staples overly one another of more than twice the stack height of other areas of that stack. Partially laterally offsetting the stapled sets relative to one another somewhat helps but does not overcome this staple buildup problem.

It has been found that a maximum stack height measurement or estimating system which does not take into account such a staple buildup will either underestimate the actual stack height of multiple stapled sets in a bin and erroneously allow attempted overfilling the bin to a jam condition, or require such a conservative estimation of actual stack height as to sub-optimize or under-utilize the usable bin capacity. Disadvantageous consequences of bin under-utilization can include, for example, unnecessarily splitting up final print jobs for a user by redirecting them to another mailbox bin or an overflow tray when there was actually still enough stacking room or headspace in the first bin to finish stacking that job or jobs in the first bin.

If an in-bin "bin full" stack height sensor which is provided to tell when a bin is full utilizes a conventional single point sensing arm, which rests on top of the stack in only one area, typically centrally thereof, that will not measure the maximum stack height unless the contact point of the sensing arm with the stack is overlying the area of the stack where stacking of multiple staples may occur, i.e., where the staples underly the sensing arm in its measurement position. Thus, such a stack height sensor can give a highly erroneous signal or reading for multiple small stapled sets.

It is desirable for a maximum stack height measurement or estimation system to accommodate a sets stapling system that allows one or more staples (different numbers and locations of staples) to be applied to bind the job sets in different positions, and also to accommodate different sizes of sheets, and different orientations of sheets or their image printing, such as what is called landscape versus portrait mode stapling. By way of background as to one example of a variable stapling position stapling system for a mailboxing system (or other set compiler), there is noted Xerox Corp. U.S. Pat. No. 5,398,918 by C. Rizzolo, et al, issued Mar. 21, 1995, attorney docket No. D/92331C. As shown there, such variable position stapling can, however, be provided along a single known position stapling line.

An important reason why a mailbox bin's remaining sheet stacking capacity cannot be estimated correctly in many cases from the incoming sheet count to that bin (the sheet input count from the printer for sheets directed to that bin, or a bin sheet entrance sensor count), is because, as noted above, there are situations in which someone pulls out only part of the print jobs from a bin, leaving other sheets still in the bin. Especially, where more than one user is assigned to the same bin(s). A sheet input or point count estimation of a bin's fullness can greatly underestimate the actual remaining stacking capacity of that bin after sheets have been removed from that bin. As discussed above, even if there is a "bin empty" sensor for that mailbox bin, it will not be activated in cases of only partial removal of sheets from the bin, and thus cannot tell the mailbox control system that this bin is now available for receiving and stacking further print jobs, even though the usable bin capacity may now be substantial. To put it another way, even if the system is one in which the system controller has been tracking (counting) the number of printed sheets sent to that bin since the last time that bin was fully emptied, that count would no longer represent the actual number of sheets in the bin after such a partial removal of sheets from the bin or incomplete job removals. Also, printer jam clearances can affect the actual sheet count, and thus the actual stack height in the bin. That is, these situations can fool or confuse a sheet input count system of stack height estimation system. A "bin empty" sensor system cannot signal an available mailbox bin even if the bin is actually almost empty, if any sheets at all are left in that bin.

There are obvious cost disadvantages in requiring a separate stack height measurement sensor for each bin of a multiple bin mailbox, for indicating full or almost full bins, and the connecting wiring to each of such multiple sensors. However, such an arrangement is shown in one exemplary embodiment of the above-cited U.S. application. Ser. No. 08/393,604, by Hector J. Sanchez, et al, or in sorters art cited therein and in other patents cited above, for fixed bins sorters with independent fixed bin entry gates. As also noted in that application, if the sensor arm is in the bin during sheet feeding into the bin, it must be designed so as not to interfere with or obstruct sheet feeding. If the sensor arm is in the bin during sheet removal from the bin, the sensor arm may be subject to bending or other damage, and also must be designed so as not to interfere with or obstruct sheet removals from the bin.

In contrast, in the stack height sensing embodiments disclosed herein, a single such sensor may be used to measure the stack height in any or all bins of a unit with an array of bins, and that same sensor unit may even be used to measure the stack height of a stack in a stacking tray associated with the array of bins. Furthermore, in contrast, in the embodiments disclosed herein below, the stack height sensor sensing arm may be automatically removed from the bin, safely out of both the sheet entrance path into the bin and sheet removal or unloading path from the bin, except when the measurement is to be made, when the sensor arm is placed in a measurement position on top of the stack in the bin.

As may be seen from the above, it is important to additionally note that certain aspects of the exemplary tray or bin stack height sensing systems disclosed herein may also have applicability to or utility in certain cases for sorters, collators, compilers, output stackers, elevator sheet input or output stackers, and other print job output stacking systems other than printer mailbox systems. For example, the problem of correctly measuring the maximum height or highest point of a stack of sheets, especially stapled sheets, adjacent the sheet input entrance to a tray or bin, is a problem in many output accumulation systems. If any part of a previously stacked top sheet or set edge in a bin or tray obstructs the eject path of sheets into that bin or tray, a jam, and possible sheet damage, is likely to occur, even if the average or other parts of that stack are well below the incoming sheet path and non-obstructing. This is a well known and long standing problem. See, e.g., Eastman Kodak Co. U.S. Pat. No. 5,026,034 issued Jun. 25, 1991 to S. M. Russel and R. H. Shea entitled "Document Output Apparatus Having Anti-Deshevelment Device" for attempting to physically hold down the top sheet(s) of the sets in the output stack during feeding of a new set onto the output stack, and previous art. (Note, however, that only single point finger contact is provided in said U.S. Pat. No. 5,026,034 system, and that the normal force applying finger there remains in the tray in the sheet input path while another stapled set of sheets is fed into the tray, and that this finger must be removed out from underneath each such newly stacking set).

A further example of a prior stack height sensing system, for an elevator type output stacker, for stapled or unstapled print jobs, with a sensing arm contacting the top of the stack, controlling the tray elevator for controlling the stacking level, is disclosed in Xerox Corp. U.S. Pat. No. 5,017,972, issued May 21, 1991 to John W. Daughton, et al.

Thus, a better measurement of the stack height, and desirably the maximum height of any portion of the stack, in the sheet entrance path to the stack, is desirable for many sheet stacking applications. With that valuable stack height measurement information, such jams can be avoided by diverting further sheets to other bins or trays if available, until the stack has been fully or partially removed, or by lowering the stack relative to the sheet entrance by lowering the tray, or vice versa, if that is available. Furthermore, bin or tray utilization can be improved by more accurate and thus less conservative estimations of whether, and how many more, sheets can be stacked into that bin without risking such input path obstructions or other stacking problems.

Single point stack contact in-bin stack height sensors such as that disclosed in Xerox Corp. U.S. Pat. No. 5,033,731 issued Jul. 23, 1991, and said U.S. Pat. No. 5,017,972, and art cited therein, do not provide such above-discussed more accurate sensing of the peak or maximum stack height in the sheet entrance path. Especially, as noted above, where the stack includes stapled sets, and staple buildup effects are causing uneven stack heights in one or more portions of the stack. If the set stapling position(s) are varied, as for different sizes of sheets, or different sheet orientations, or different desired set binding positions, then the staple buildup high points in the stack will also change, so that a fixed single point stack measurement position would not be accurate, even though the stapling position(s) may only vary along a single line.

A dual point stack height sensor was provided in the Xerox Corporation "5355" copier for controlling the elevator motor of the stacking tray of the compiler/stapler/stacker finishing unit. Two widely spaced arms pop out to sense stack height by contacting the top of the stack in the tray only briefly after each stapled set is ejected, then retract behind the registration wall.

In the Xerox Corporation "1075", "1090" and "5100" copiers, an elevator type stacking tray is provided for the output, and this output may optionally be stapled sets. See, e.g., Xerox Corporation U.S. Pat. No. 5,017,972, issued May 21, 1991 to John W. Daughton, et al. A conventional stack height sensor arm 114, with upper and lower switches 120 and 122, is illustrated in FIG. 2 and described in Col. 8 thereof. However, in those and previous products, there was noted the problem further described herein that such a single point contact stack height sensor finger cannot accurately control a stacking tray elevator vertical movement to provide a proper stacking output level or drop or clearance below the output when there is staple build up in other areas of the stack which are not under that sensing finger. Accordingly, in those prior art products there was additionally provided some software in non-volatile memory directed to that problem. Specifically, when the copier controller noted that a large number of stapled sets were to be outputted in the tray, of a small number of sheets per stapled set, so that there would be a large number of staples in the output stack, which would cause staple build-up, then the controller provides a stop signal after a preset large but limited number of such stapled sets are ejected into the output stacking tray. The copier is then automatically stopped and a display on the GUI generated, instructing the operator to unload the output tray, even though the stack height sensor is still signaling an appropriate range or level of stacking. However, there was no point count or attribute system. This fix simply stopped all printing after a preset maximum number of stapled sets, even though the stacking tray was still capable of stacking a much larger number of unstapled sheets, i.e., had not reached its maximum capacity and could actually have stacked a much larger number of stapled or unstapled sheets.

To express this in other words, the Xerox Corporation "1075", "1090", and "5100" copier products all had software which provided an algorithm or matrix that limited the output to the output stacking tray depending on stapled set thickness. That is, as the number of sheets per stapled set decreased, the number of sets that could be printed and outputted at one time was reduced, and the machine was instructed to stop and tell the operator to unload the output stacking tray. This prevented what would otherwise have been staple build-up problems. The machine stopped all printing after the number of sets of a given number of sheets per stapled set was printed, even though the physical stack height sensor was indicating remaining sheet stacking capacity and even if the elevator stacking tray actually had additional stacking capacity and could have been further lowered by its elevator mechanism. E.g., the machine stopped printing after "X" sets of two sheets per stapled set, "X plus Y" sets of 2+C sheets per stapled set, etc.

Seiko Epson Corporation U.S. Pat. No. 5,141,222 issued Aug. 25, 1992 by Shigeru Sawada, et al., describes a printer mailbox system with "bin full" signals. A prior art stack height sensors system in the "9900" duplicator had two parallel Light beams extending over the top of the stack to sensors on the opposite side to detect a full or maximum stack height in the elevator output tray. However, those were fixed position, fixed height, sensors, and did not have any tamping or knockdown action, and required separate sensors for each bin.

An example of a fix for excessive set thickness, including sets with thicker sheets, is disclosed in Xerox Disclosure Journal, Vol. 14, No. 6, published November/December, 1989 at page 285, entitled "Finisher Ejection Algorithm", by John W. Daughton, et al. This relates to the limited capacity of a compiler tray, not the output stacker. It is suggested here that even though the compiler tray is capable of handling up to 100 sheets of 20# paper, that it may not be desirable to eject said thick sets, and therefore if the number of sheets to be sent to the compiler/finisher is greater than 70, this system compiles only 50 sheets and then ejects those to the output tray without offsetting the output tray. Again, this wastes available capacity and requires extra steps and reduces the capacity for stapled sets.

An additional feature disclosed hereinbelow is an improvement in in-bin maximum stack height sensors and sensing systems in general, not limited to mailbox systems, although of particular value thereto. In a disclosed embodiment herein, in lieu of a conventional stack height sensor with a sensing arm making only a single point stack contact with the top of the stack, in only one area of the stack, there is a stack height sensor with a full width sensing bar which is brought down onto the top of stack for measuring the maximum stack height. This sensing bar preferably extends laterally across the entire stack, across all the potential staple buildup areas, in its measurement position, which is preferably adjacent the sheet entrance path to the stack, transversely of the sheet entrance path direction, so as to measure the maximum stack height in the sheet entrance to the stacking tray or bin. The latter may be accomplished by constructing and mounting said sensing bar so that when the sensing bar is dropped and/or pressed onto the top of the stack it is positioned along the line in which sets in the stack will have been stapled, even if there were variable set stapling positions, so as to more accurately detect the true highest point on the stack in the sheet entrance path to the stack. This extended sensing bar is preferably extending out to the stack lateral edges in operation, and provided with a normal force, so as to provide sheet settling assistance when it is dropped and/or pressed onto the top of the stack. Especially, sheet knockdown assistance for lightweight sheets hanging up on side guides of the tray or bin, which is a well known sheet stacking problem, especially for light weight and/or skewed delivery sheets.

Further disclosed features of the embodiments further disclosed hereinbelow include a sheet stacking system with an array of plural sheet stacking bins with sheet entrances for stacking plural flimsy print substrate sheets from a printed sheets output path into selected said sheet stacking bins, including a sheet feeding input path system for feeding selected said sheets into a selected said sheet stacking bin to be stacked therein, and further including a bin fullness indicator system for indicating that the estimated height of the stack of said sheets stacked in a said sheet stacking bin has reached a preset allowable maximum, and further including a stacking control system controlled by said bin fullness indicator system to control said sheet feeding input path system for said bins; the improvement comprising a single stack height sensing system for respective measurements of the actual stack height of the stack of said sheets stacked in respective ones of said array of plural sheet stacking bins to provide said bin fullness indicator system; a movable carriage system for moving said single stack height sensing system from adjacent to one said bin to adjacent to another said bin for said respective measurements of the actual stack height of the stack of said sheets stacked in said respective bins; said stack height sensing system including a stack height sensor which moves with said movable carriage system; said stack height sensor including at least one movable sensing element mounted to be extended into a said bin adjacent to said movable carriage system to detect the stack height of the stack of said sheets stacked in said adjacent bin, and a signal generator responsive to said sensing element to provide control signals to said stacking control system.

Additional disclosed features of the specific embodiments hereinbelow include, individually or in combination, a sheet stacking system wherein said stack height sensor sensing element is mounted to be normally automatically retracted from a said bin so as not to interfere with said movement of said movable carriage system from adjacent to one said bin to adjacent to another said bin; and/or wherein said stack height sensor sensing element is pivotally mounted to retractably pivot outside of said array of sheet stacking bins; and/or wherein said movable carriage system moves substantially parallel to said sheet entrances to said array of sheet stacking bins; and/or wherein said movable carriage system is part of said sheet feeding input path system for feeding selected said sheets into a selected said sheet stacking bin to be stacked therein; and/or wherein said movable carriage system includes a compiling and stapling system for compiling and stapling sets of said printed sheets to be fed into an adjacent said bin; and/or wherein said array of a sheet stacking bins includes at least one high capacity adjustable height sheet stacking elevator tray, and said stack height sensing system alternatively measures the height of the sheets stacked in said elevator sheet stacking tray to control said adjustable height sheet stacking elevator tray; and/or wherein said array of a sheet stacking bins is part of a mailbox system in which bins are assigned to different users, and in which different numbers of said sheets are fed to different selected said bins by said sheet feeding input path system, wherein a maximum allowable sheet stacking height is preset for said sheet stacking bins, and wherein said stack height sensing system is automatically moved by said movable carriage system to adjacent to the selected said bin into which further sheets are to be fed by said sheet feeding input path system to measure said preset maximum allowable sheet stacking height of the stack of sheets in that bin; and/or wherein said movable carriage system is part of said sheet feeding input path system for feeding selected said sheets into a selected said sheet stacking bin to be stacked therein, and wherein said movable carriage system also includes a compiling and stapling system for compiling and stapling sets of said printed sheets to be fed into the adjacent said bin; and/or wherein said movable carriage system moves substantially parallel to said sheet entrances to said array of sheet stacking bins, and wherein said stack height sensor sensing element is mounted to be automatically moved out of said adjacent bin when said movable carriage system is moving said single stack height sensing system from adjacent to one said bin to adjacent to another said bin; and/or a shared users multiple bin mailboxing system adapted to receive plural print jobs of plural sheets for plural different recipients stacked in individual print job storage mailbox bins, said mailbox bins being electronically assignable to different respective recipients, and said mailbox bins having a limited preset maximum sheet stacking capacity, and said mailboxing system further having a sheet distribution system for automatically variably directing and stacking into different individual said mailbox bins the respective plural print jobs of different recipients, and further including a bin fullness indicator system for indicating that the number or height of the stack of said sheets stacked in a said sheet stacking bin has reached a preset allowable maximum, and further including a stacking control system controlled by said bin fullness indicator system to control said sheet distribution system for said bins; the improvement comprising a single stack height sensing system for respective measurements of the actual stack height of the stack of said sheets stacked in respective ones of said array of plural sheet stacking bins to provide said bin fullness indicator system; a movable carriage system for moving said single stack height sensing system from adjacent to one said bin to adjacent to another said bin for said respective measurements of the actual stack height of the stack of said sheets stacked in said respective bins; said stack height sensing system including a stack height sensor which moves with said movable carriage system; said stack height sensor including at least one movable sensing element mounted to extend into said bin adjacent to said movable carriage system to detect the stack height of the stack of said sheets stacked in said adjacent bin, and a signal generator responsive to said sensing element to provide control signals to said stacking control system; and/or wherein said single stack height sensing system additionally provides a separate bin almost-full signal when the sheet stacking level sensed by said sensing system in the respective individual said mailbox bin passes a preset almost-full level which is less than a preset maximum stacking capacity of that bin, which preset almost-full level will allow a known preset additional number of sheets to be directed to that same individual said mailbox bin by said sheet distribution system to be stacked into that bin by said stacking control system; and/or wherein said stacking control system, upon receiving said bin almost-full signal, determines if the subsequent print job would exceed said preset limited further number of said printed sheets, and if so controls said sheet distribution system to direct at least part of said subsequent print job to a different said mailbox bin; and/or wherein said stack height sensor sensing element is mounted to be automatically moved out of said adjacent bin when said movable carriage system is moving said single stack height sensing system from adjacent to one said bin to adjacent to another said bin, by being normally retracted from any said bin and only briefly intermittently moved into said adjacent bin for said stack height sensing; and/or wherein said movable carriage system is part of said sheet feeding input path system for feeding selected said sheets into a selected said sheet stacking bin to be stacked therein; and/or wherein said movable carriage system includes a compiling and stapling system for compiling and stapling sets of said printed sheets to be fed into an adjacent said bin; and/or wherein said stack height sensing system includes an actuator system to briefly extend said stack height sensor sensing element into an adjacent said bin for checking the stack height in said bin at periodic intervals which will not interfere with sheet stacking in said bin.

Further by way of background, as described in the above cited patents, a mailbox can be used as an output accessory for various existing or future printers. The term printer can broadly encompass, e.g., various known discrete, connected, and/or multifunction devices such as those providing local digital copier, scanner, facsimile and/or networked PDL or electronic mail printer functions. A mailbox system may automatically discretely handle and segregate shared printer outputs by printer users, from various such, or other, types of printers, for different users or addressees, automatically and simply. A "mailboxing" unit can be a universal modular or stand-alone unit that may be attached to, or even simply moved next to, the output of almost any printer, or it may be integral the printer. Mailbox bins may also, if desired, have locked access privacy doors or the like, and automatic unlocking systems, as also taught by the above cited and other patents cited therein. If desired, as also so taught and shown here, integral job set compiling and finishing (e.g., print job set stapling) and stacking may also be provided in or as a part of the mailboxing system.

The kind of mailboxing described herein is for stacking physical "hard copies", i.e., conventional printed image physical substrate sheets of paper and the like, and should not be confused with electronic document page storage systems used in facsimile machines and network printing document inputs, etc. The term "sheet" or "hard copy" herein refers to a usually flimsy sheet of paper, plastic, or other such conventional individual physical imaging substrate, and not to electronic images. Related, e.g., page order, plural sheets documents or copies, or plural sheets fastened together, can be referred to as a "set". A "job" or "print job" may refer to one or more documents or sets of documents beings sent to or received by a particular addressee or designee.

As is also taught in the above-cited "mailbox" patents, another desirable optional "mailbox" feature is a variable and virtual bin system, in which the software in a programmed computer or controller controlling the mailbox sheet distributor puts the print job output of user (or users) A into an electronically assigned bin X which is determined to be then available from a bin availability system and/or sensor. Then, if a subsequent set or job for user A will also fit into bin X, it is also put into bin X. If not, then the subsequent set or job for user A is automatically put into an assigned "overflow" bin Y, etc. I.e., for each user, the number of assigned bins is automatically increased to meet the users need. Adjacent mailbox bins may be selected and used for the job overflow, if available, or a larger capacity overflow tray, as is known for sorters. Plural mailbox units may also be serially ganged, as is know for plural sorters, to increase the number of available bins.

However, as noted in said prior mailbox system patents, with prestapled job sets, a whole job set must be put into a bin at a time (vs. individual sheets stacked in the bin one-at-a-time). Thus, the decision to put the next job in another bin should be made in advance, with knowledge of the size of the next job set versus the remaining capacity of the bin presently being used for job stacking.

The presently disclosed apparatus may be readily operated and controlled with conventional control systems. It is well known and commonplace to program and execute imaging, printing, document, and/or paper handling control functions and logic with software instructions for conventional or general purpose microprocessors. This is taught by various prior patents and commercial products. Such programing or software may of course vary depending on the particular functions, software type, and microprocessor or other computer system utilized, but will be available to, or readily programmable without undue experimentation from, functional descriptions, such as those provided herein, or prior knowledge of functions which are conventional together with general knowledge in the software and computer arts. That can include object oriented software development environments, such as C++. Alternatively, the disclosed system or method may be implemented partially or fully in hardware, using standard logic circuits or a single chip using VLSI designs.

As further discussed hereinbelow, it will be appreciated that in a modern system or networked office environment, various of the control and/or software functions described herein may be done in the network system print server or controller rather than in the mailbox unit or the printer unit per se. Likewise, as is also known and taught, user interactions, control and status displays with, for, and from the printing and mailboxing apparatus and its operations can be on and from the terminals or PC's of individual networked users. Control signals and terminal display interactive interfaces between user remote terminals and electronic printers in general are known and commercially available and need not be described in detail herein. Examples of some recent patents relating to network environments of plural remote terminal shared users of networked printers include Xerox Corporation U.S. Pat. Nos. 5,243,518; 5,226,112; 5,170,340; 5,287,194; and 4,453,128. Some patents on this subject by others include U.S. Pat. Nos. 5,113,355, 5,113,494, 5,181,162, 5,220,674, 5,247,670, 4,953,080 and 4,821,107, 4,651,278, 4,623,244, and 4,760,458. Some of the following Xerox Corporation U.S. patents also include examples of networked systems with printers: U.S. Pat. Nos. 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Some of these patents also disclose multi-functional machines (digital printer/scanner/facsimile/copiers) and their controls. Various publications, including commercial "systems software" packages, including LAN workstation connections software, are well known in this art, e.g., those widely available from Novell, Microsoft and IBM.

All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the examples below, as well as the claims. Thus, the present invention will be better understood from this description of embodiments thereof, including the drawing figures (approximately to scale) wherein:

FIG. 1 is an enlarged frontal view of a first embodiment of a bin full and almost full sensing or stack height measurement system, which may be used for bin full and/or almost full sensing of any selected bin of an array of sheet stacking bins;

FIGS. 2, 3 and 4 show a second embodiment of a stack height measurement system, which may be used for bin full and/or almost full sensing, and which is specially adapted to measure maximum stack height in the sheet entrance area and in stapled set buildup areas, as illustrated, which embodiment is shown in a frontal view in FIG. 2 with the tray and stack in cross-section at a staple and arm position, and shown in an identical end view in FIGS. 3 and 4, wherein FIGS. 3 and 4 respectively illustrate two different operating positions thereof, a normal or non-obstructing position and a maximum stack height measurement position;

FIG. 5 is a frontal partially schematic view of one example of a multibin array "mailboxing" system unit connecting with the sheet output of a printer (partially shown schematically), with an example of a repositionable sheet transport and bin selection or distribution system, here a finishing carriage, carrying therein a subject exemplary bin full and almost full sensing system, and also showing an exemplary optional elevator sheet stacking tray and an exemplary optional passthrough sheet transport to another such mailbox unit (partially shown) ganged thereto;

FIG. 6, labeled "prior art", is a schematic overall view of one example of an electronically networked system of plural users (plural workstations) sharing an electronic printer, in end view, based on FIG. 1 of U.S. Pat. Nos. 5,008,853 issued Apr. 16, 1991, which printer may be that of FIG. 5, or otherwise;

Figure 1:
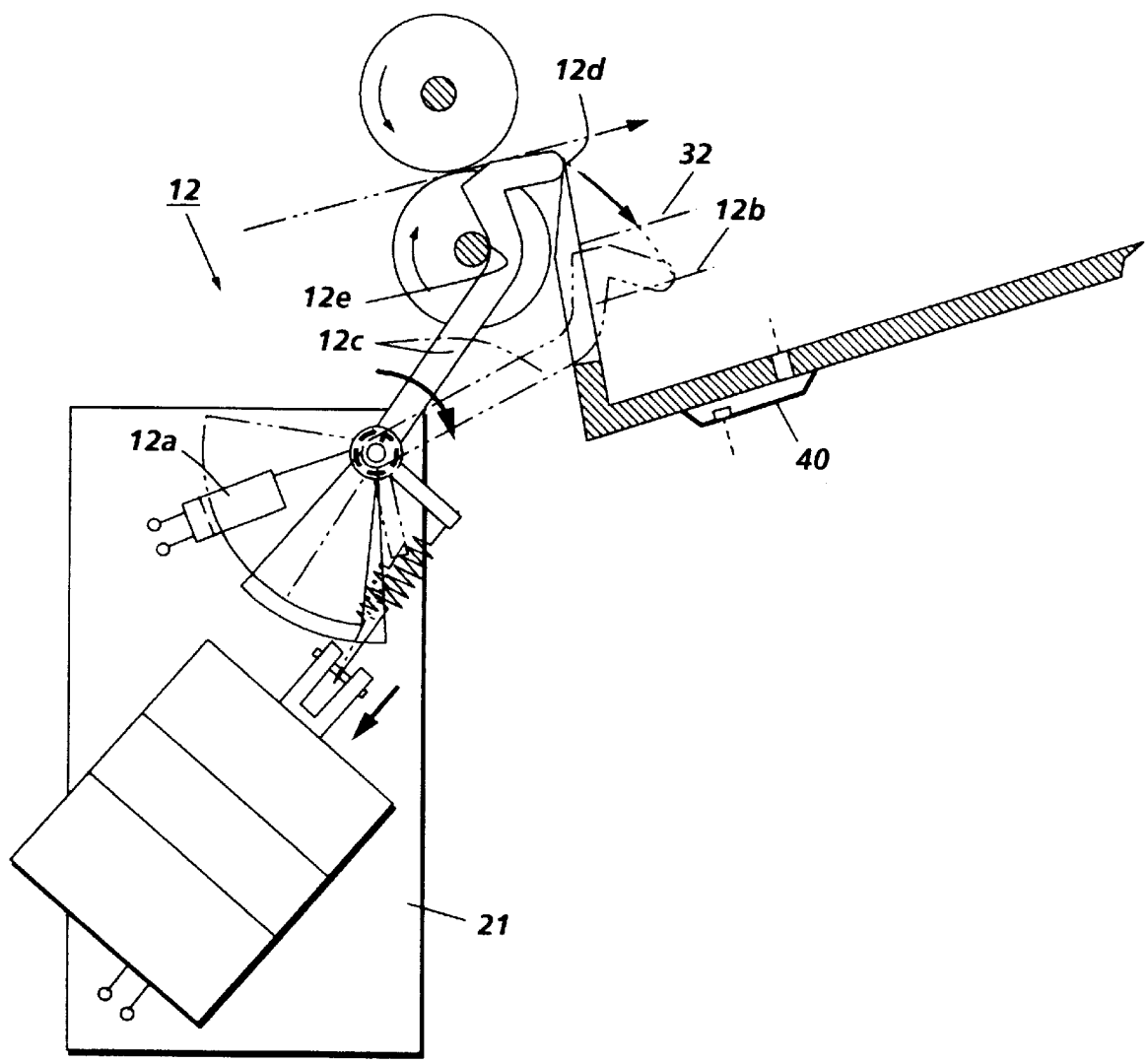
Figure 4:
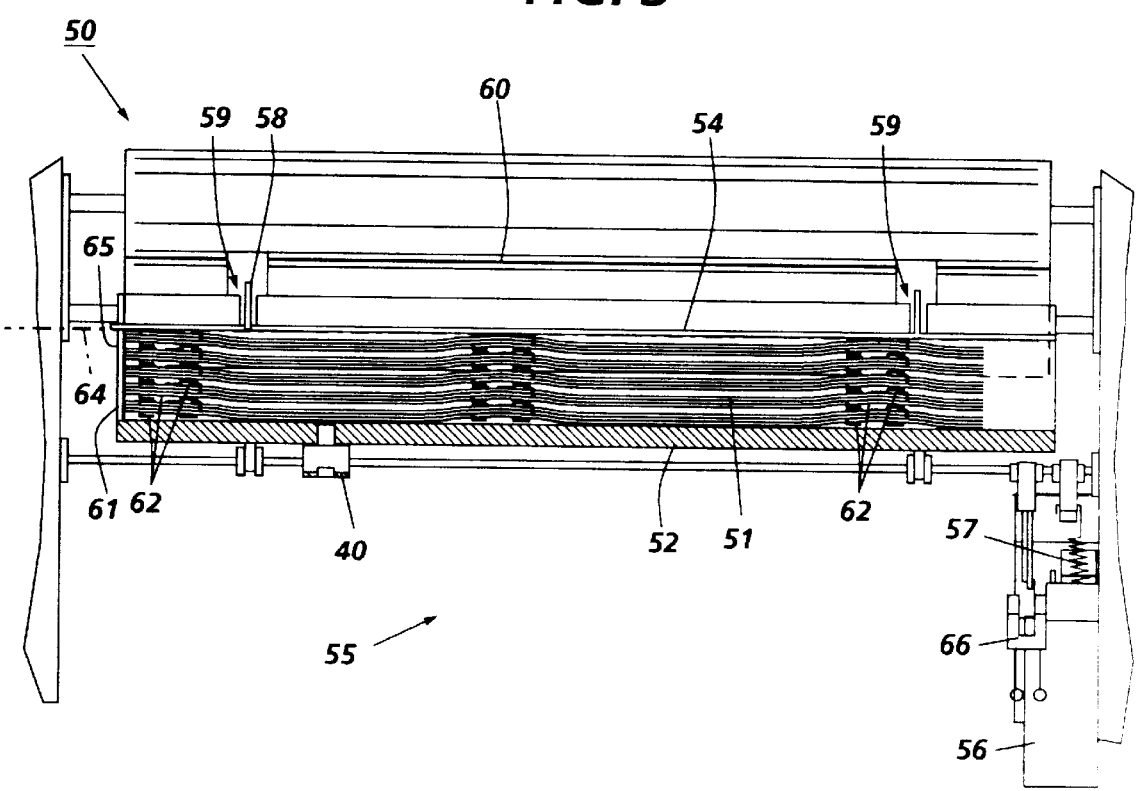
Figure 5:
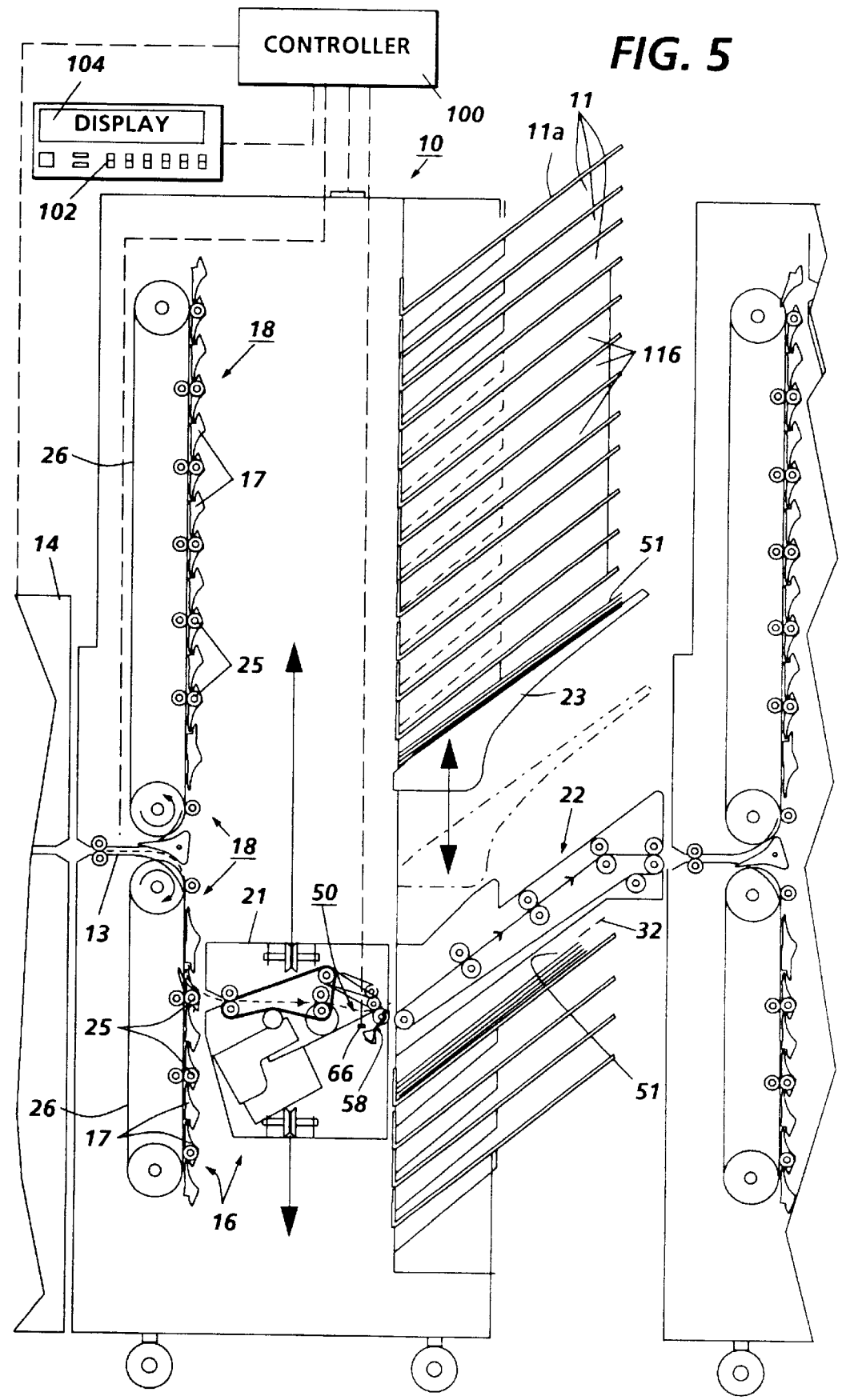
Figure 7:
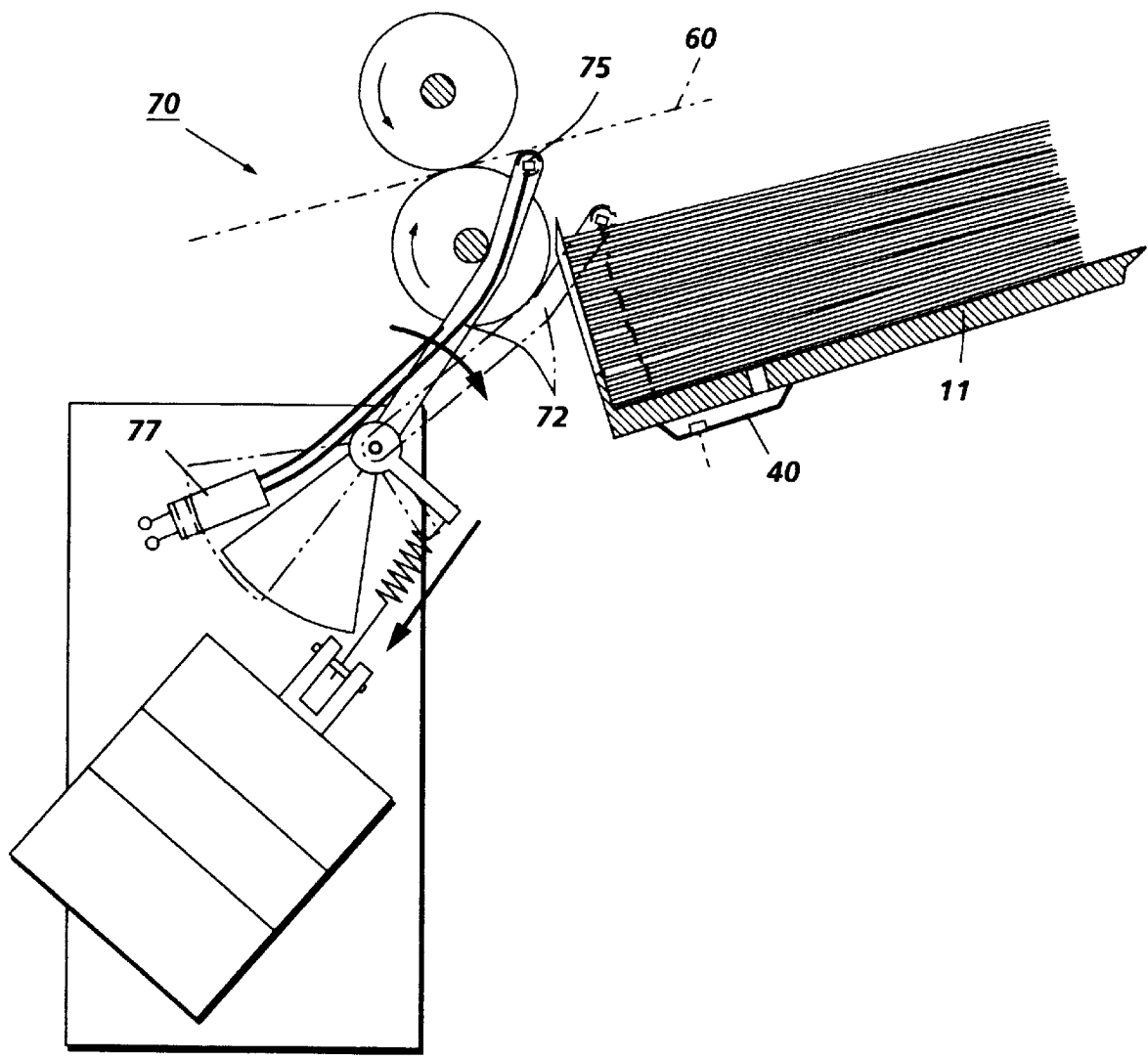
FIG. 7 shows a frontal view of a third embodiment of a stack height measurement system which may be used for bin full and/or almost full sensing of a selected bin of an array of sheet stacking bins, as in FIG. 5, but with an optical beam interruption system.
Figure 8:
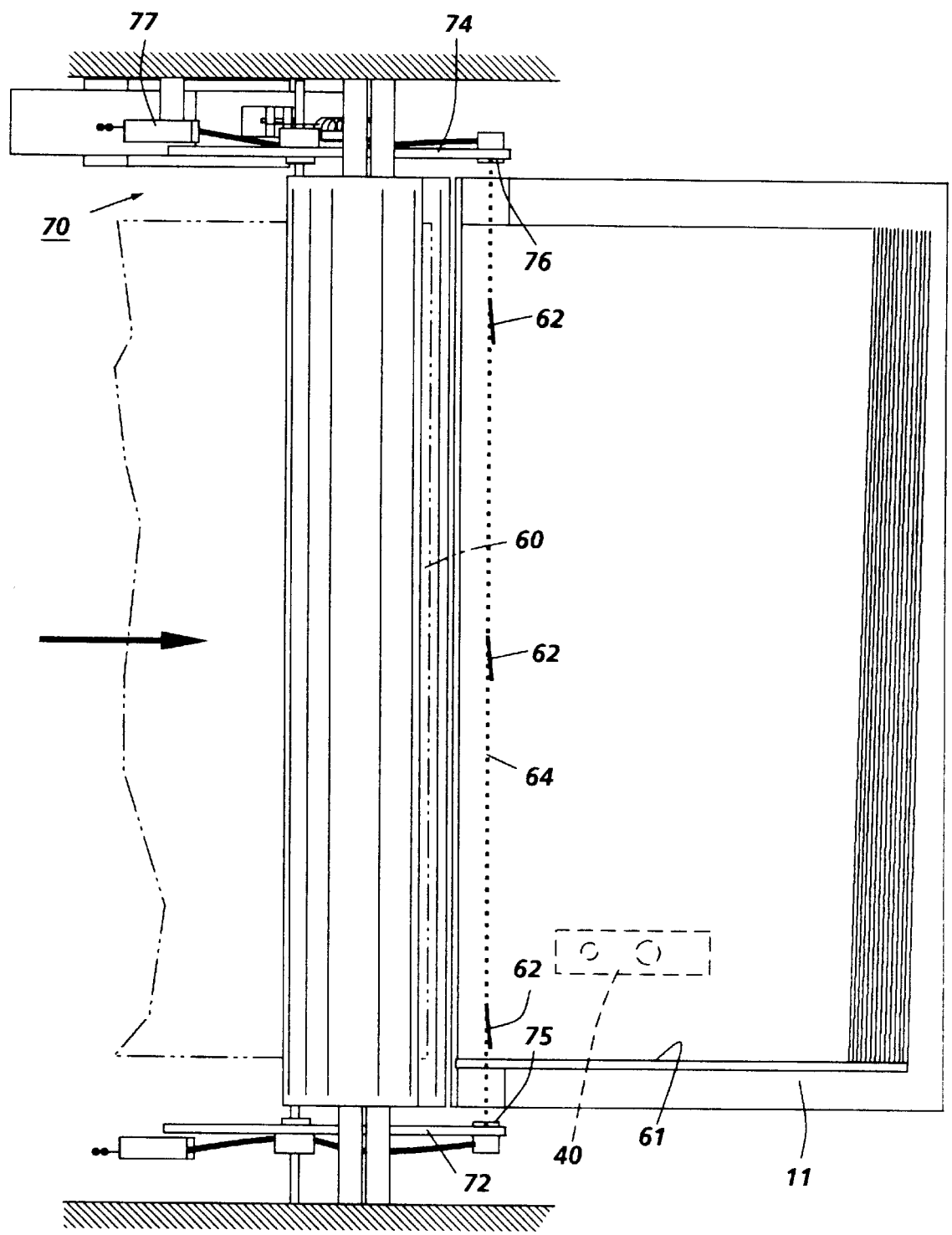
FIG. 8 is a partial top view of the embodiment of FIG. 7.

Turning first to the exemplary embodiment of a mailbox unit 10 as shown in FIG. 5, with an incorporated subject bin stack height sensing system, it will be appreciated that these are merely examples of the claimed system(s). The general reference number 10 is utilized here for the overall mailbox unit or module. It is further described later below. The stack height sensing system shown here in FIG. 5 is marked 50, in reference to the embodiment shown in FIGS. 2–4. However, for those common purposes of operation, functions and controls to be described below, it could alternatively be the stack height sensing system embodiment 12 as shown in FIG. 1, or a stack height sensing system 70 as shown in FIGS. 7 and 8, or other sensing systems and functions, which could have a similar appearance in the small scale of FIG. 5.

The mailbox bins, 11, 11a, 11b, etc., illustrated or described herein are also merely exemplary, and may vary considerably. The general reference number 11 is used throughout for any individual mailbox (bin). Bin 11a here is an exemplary higher capacity open overflow bin, conventionally located here as the top bin. This top bin or tray 11a of the unit 10 may conventionally provide an open or "public" bin. A top bin is commonly used for undesignated or unknown user's jobs, job overflows, jam purges, etc., since it is not limited in stack height by any overlying tray. Bins 11b here schematically represents some examples of restricted access mailbox bins 11 which are lockable and unlockable, e.g. have latched privacy doors, as described further in the above cited patents thereon.

Figure 6:
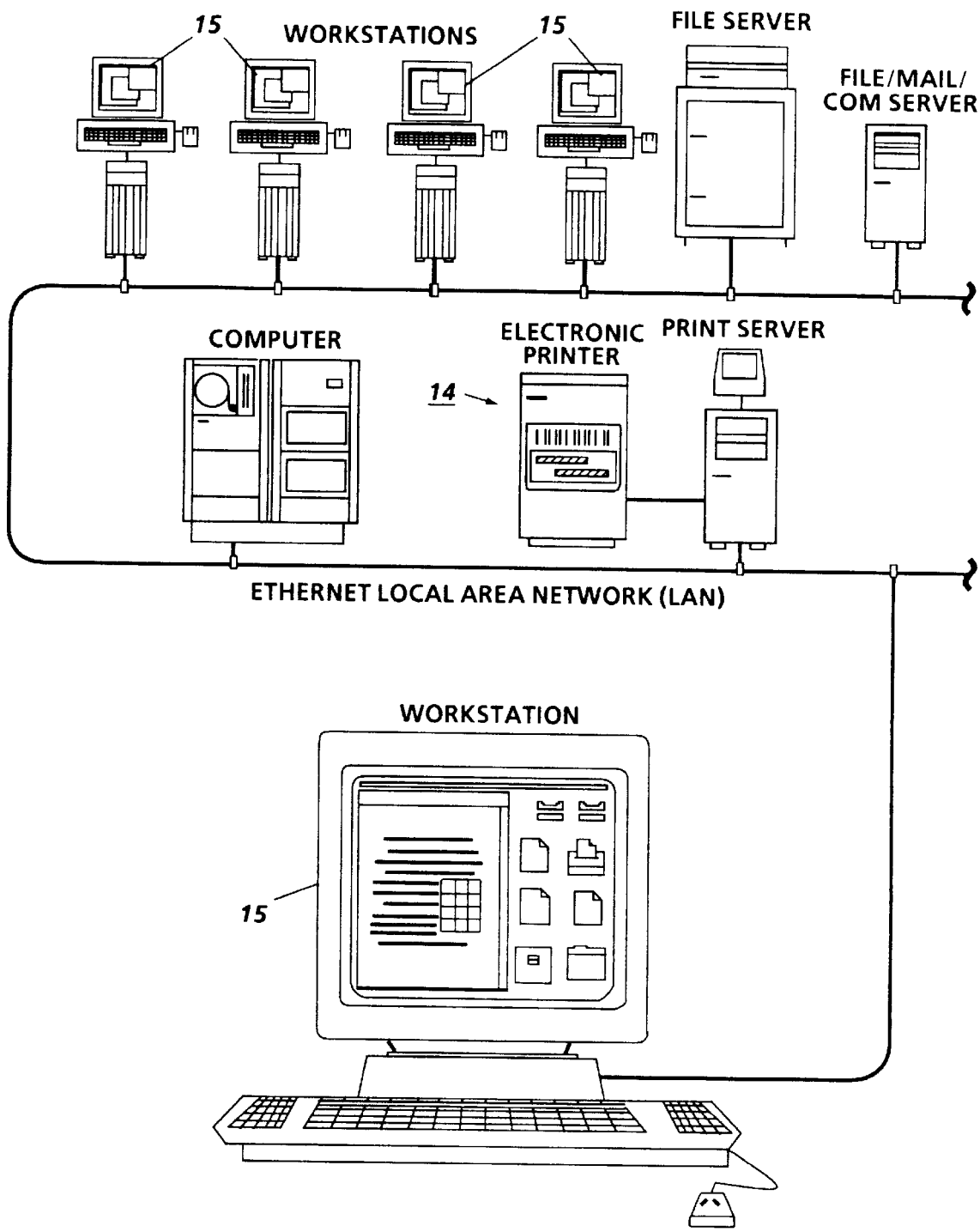

Various printers (of which printer 14 in FIGS. 5 and 6 is merely one schematic example) may be connected to these and other mailboxing systems, with little or no printer modifications, as part of various systems. In FIG. 6, merely by way of an example of systems applications, the exemplary shared user electronic printer 14 is shown connected into a conventional prior art inneroffice or interoffice system electronic network with various remote user terminals (workstations) 15, one of which is shown here in an enlarged view. Some other possible typical network system components are also illustrated and labeled.

Preferably the mailbox unit has a sheet input or entrance such as 13 which adapts or adjusts to common or various printer output levels, or an interface unit or interconnect transport may be provided in a known manner to sequentially feed the printer output sheets from the printer 14 into the mailbox unit 10 sheet entrance 13. Alternatively, the mailbox unit can be integral the printer unit, built into or attached above or to one end thereof, such as by conventionally integral cantilever mounting to or above the output end of the printer 14, like certain known sorters. The conventionally sequentially received hard copy of plural page documents from the pre-collation output electronic printer 14 or the like is thus fed into the mailbox unit 10, along with any added or interposed insert sheets, such as covers, tab sheets or color photographs, to make up desired print jobs. The path of these sheets in the mailbox unit is via a sheet distribution system 16 automatically controlled by a controller 100, or otherwise, for the particular bin 11 assignment or destination of the particular job sheets. As noted previously, and extensively discussed in above-cited patents, the mailbox unit 10 preferably directs all designated sheets of a users job to an available bin or bins 11 which are temporarily assigned to that particular printer user, based on bins availability, which may be an empty bin or a bin which is not yet full.

Preferably, each bin 11 has an individual "bin empty" sensor, such as that described in Xerox Corp. U.S. Pat. No. 5,328,169 issued Jul. 12, 1994 to the same Barry P. Mandel, or otherwise, here shown for example as bin empty sensors 40, which are all connected to controller 100. This enables the sheet path control bin selection system of the mailbox unit 10 to know immediately when any bin has been fully cleared by anyone (a printer user, print job or facsimile addressee, recipient, system administrator, etc.). Thus, any empty bin can be refilled with further print jobs for the same designee(s), or immediately reassigned to a new user, job addressee or recipient. This is the case even where the same mailbox bin or bins may be allowed to shared by more than one user or addressee, since, notwithstanding directions or displays to the contrary, any user or addressee with access to that bin could remove all the print jobs in that bin, not just his or her own printjobs. However, if only his or her own print jobs are removed from that shared bin, and there are any print jobs for others left remaining in that bin, or reinserted back into that bin, the bin empty sensor cannot tell how much material was removed, or how much stacking space is thus now available, as even a single remaining sheet in the bin will block such a bin empty sensor.

A bin fullness sensor, such as those described herein, or others, could be modified to additionally sense empty, and thus fully available, bins, and eliminate any need for separate bin empty sensors such as 40. E.g., by providing for the end of the stack height sensor arm extending into the bin to partially drop though a hole or slot in the bin tray bottom to an arm position triggering another optical or other sensor for that bin empty arm position, as is well known in the set separator sensor art for recirculating document handler trays. However, since here a single stack height sensor is desired to be used and shared for all the bins in the array of bins, that would require this single sensor to be frequently moved up and down the array of bins to check for emptied bins. That would reducing productivity while that is being done.

Thus here, bin empty sensing, such as 40, is combinable with, but distinct from, the presently disclosed system for checking for full or almost full bins, since the single stack height sensor disclosed here for that function in mailbox units is mounted on, and moves with, the mailbox carriage unit 21 which is part of the sheet distribution system 16 directing sheets into the particular bin 11 which is then being filled here. Thus, the stack height sensor system here is already automatically located adjacent to the particular bin 11 who's stack height needs to be sensed or measured during filling since it is the bin being filled at that time. However, unlike bin filling, as to bin emptying, any mailbox bin 11 may be manually emptied at any time, unless it is a locked bin 11b. Even if the controller 100 receives an unlocking signal or password, it will only know which bins 11b have been unlocked then, and will not know whether or not those unlocked bins have actually been either partially or fully emptied, unless there is a bin empty detection or sensing signal from that bin.

Referring further to the illustrated exemplary mailbox unit 10 in FIG. 5, this is a universal stand-alone unit that is attached to, or simply moved next to, the output of almost any conventional printer. This particular illustrated mailbox unit 10 is basically that shown and described in the above cited and incorporated prior Xerox Corporation mailbox unit U.S. Pat. Nos. 5,382,012 issued Jan. 17, 1995, and 5,370,384 issued Dec. 6, 1994, and thus need not be redescribed in detail here. This particular mailbox unit 10 has plural fixed bins 11, into which either single sheets, or collated and stapled or unstapled job sets of multiple sheets, are selectively fed by a sheet distribution system 16, here including a vertically repositionable (movable) bin selector carriage 21. As further described and disclosed in above cited prior patents, the movable carriage 21 comprises an integral sheet set collator and finisher unit which may be called a finishing carriage. The selected vertical position of the finishing carriage 21 here also serves to cam actuate the selected corresponding position sheet deflector gate 17 in the sheet vertical transport path 18 on the upstream side of the finishing carriage 21, so as to select the sheet path from the transport path 18 through the carriage 21 into the adjacent selected bin 11. The belts 26 of the vertical transport 18 are laterally spaced apart so that the fingers of the selected gate 17 may pivotally extend between the belts 26 when that gate 17 is actuated. The particular vertical transport 18 here has sets of both up and down flights of moving belts 26, each with mating belt rollers 25, to allow for the mailbox unit 10 sheet entrance 13 to be centralized by entering in between these up and down belt flights.

This internal sheet feeding and/or sheet distribution system in the mailbox unit can utilize various other alternative different known random access bin selector type sorter sheet transports, many of which are known in the art. Various well known feeding and gating arrangements whereby inputted sheets are fed to and gated into selected bins include, for example, a moving gate sheet deflector system without a compiler or finisher, such as is disclosed in Norfin Co. U.S. Pat. No. 3,414,254 to Snelling, et al.

The collator, stapler and stapling system on the finishing carriage 21 may be, for example, that further described in Xerox Corporation U.S. Pat. No. 5,398,918 (D/92331C) issued Mar. 21, 1995 to C. Rizzolo, et al. It provides stapling in one or more locations selected by linear movement of a stapling head along a stapling line, which line position may be preset to a small fixed distance parallel to one edge of the compiled set. Thus, as finished sets are stacked into a bin 11 from the finishing carriage 21, any staples in the print job set are known to be somewhere along a known position line, shown in one example here as the staple positions line 64 in FIGS. 2, 3 and 4. (See also FIG. 8.)

As is also shown here with this exemplary mailbox unit 10 in FIG. 5, additional mailbox units such as 10 can be extended or serially connected to provide additional sets of available bins 11, where desired, as is well known in sorting. That is, plural mailbox units 10 may be ganged in series like plural sorter units using sheet pass-through or bypass feeders such as 22 shown here. This is further described in said Xerox Corporation U.S. Pat. Nos. 5,382,012 and 5,370,384.

The relatively low capacity (e.g., less than 100 normal sheets) mailbox bins 11 normally used for separating by users their plural printing jobs, which may include copying or fax jobs, may also be supplemented by optional or overflow sheet delivery into a high sheet capacity stacking tray system, such as the FIG. 5 elevator stacking tray 23, which is desirably part of the same vertical array of bins, and desirably selected and fed sheets or sets of sheets by the same sheet distribution system 16. That can be an optional module mounted onto the same frame in place of one or more of the mailbox bins 11, as disclosed in above-cited patents, especially U.S. Pat. Nos. 5,382,012 or 5,370,384. The structure and operation of such an elevator stacking tray 23 is well known per se, and described in some of the above cited patents. An elevator motor system connecting with the elevator tray 23 maintains the top of the stack of accumulating sheets thereon at a suitable height below the sheet input to that stack, which here is the exit or eject rollers nip of the finishing carriage 21. This typically requires a separate sensor and sensing arm to sense the stack height in the elevator tray 23 to control the actuation of the tray elevator motor.

It will be appreciated that the stacking height or sheet capacity of the bins in any given mailbox unit may vary. A sorter or mailbox may have repositionable trays for changing their spacing. Furthermore, certain bins such as lockable mailbox bins or bins with privacy doors may have a somewhat smaller usable available spacing between bins and/or stacking height and thus bin capacity, due to thicker tray materials, the bin door locking mechanisms, or the set removal system from the tray, etc. Privacy door restricted access bins are described in detail in the above cited patents, and schematically shown at 11*b* in FIG. 5. Bins which are to be shared by more than one user might be higher capacity bins than those bins which will not be shared. As discussed, the top bin typically is an overflow bin with much higher maximum stacking level or capacity, since there is no overlying or superposed tray. Additional overflow or large jobs stacking can be provided by a special stacking tray, as exemplified by the high capacity elevator stacking tray 23 shown in FIG. 5 and further described herein.

As variously taught by above-cited patents, the disclosed mailboxing system can provide for stacking the sheets sequentially outputted from the printer 14 in separate job sets into one or more temporarily and/or variably reassignable mailboxes 11 of the mailboxing or job sorting accessory unit. This assignment can be by a mailbox controller 100 controlling a sheet distribution system such as 16, automatically and/or with keypad 102 and/or display 104 entry by a user or system administrator, and/or with initial setups in NVM by the installer, and/or or remote terminal electronic setups or changes such as from remote workstations 15. The setups and/or defaults can be for the entire mailbox or for individual bins. As will be further discussed, the system setup my may include assigning more than one user to one or more bins, e.g. a workgroup or team and/or a secretary may share bins. Some or all of the assigned mailboxing units or bins thereof may have "privacy doors" which are normally locked to restrict access to at least some of the mailbox bins, with electrical unlocking of selected bins privacy doors in response to entry of a access code for that user on the keypad 102 or elsewhere, and/or other features, as also described in the above cited mailbox patents.

As taught in those cited patents, what is normally desired for the output for each utilized mailbox bin is plural, pre-compiled, preferably offset (and/or pre-stapled) job sets stacked in selected bins respectively assigned to respective users of the printer 14. What is also desirable is an automatic overflow assignment system of additional temporarily designated bin(s), as needed, to provide effectively unlimited or "virtual bin" plural job stacking. As will be further described, this bin reassignment and/or job overflow system is preferably integral with and controlled by the disclosed bin full and/or bin-almost-full sensing systems herein. As is also described in said cited mailbox patents, a variable display such as 104 may be provided to indicate the assigned bin and any overflow bins into which that particular users print jobs have been placed last and not yet removed. This instructional display can also be on the respective user terminal 15 display (FIG. 6). That is, the mailbox system or system server can automatically generate network messages sent back to the user's (job senders) terminal 15, and/or to the systems administrator terminal 15, if desired, so that the terminal 15 screen displays a status message like "your print job is completed-remove it from bins #3 and 4"; or "the printer is out of paper"; or "all bins are full-clear bins to continue printing", and the like.

As further described in said U.S. Pat. No. 5,328,169 and related patents, one aspect of such a "dynamic" (variable) user bin assignment system is that each "mailbox" (separate bin to be utilized therefor) can be frequently checked (updated) for reassignment of that bin to a new user. That is, reassignment to other users of bins which have since become available by the removal of all the printer output sheets therefrom by the previous user of those bins. The mailbox controller 100 can periodically interrogate the bin-empty sensors 40 to see which bins 11 are then empty. This interrogation is preferably done each time the printer and/or print server is sent (and/or is preparing to print) a print job. Unlike a sorter or collator, it is not necessary to free up (empty) a whole series of bins. Any one free bin can be fed job sheets, even if that one empty bin is between other, unemptied, bins. The bins assigned are then stored in memory, and can be identified whenever jobs are to be retrieved. However, as discussed elsewhere herein, there are situations is which having only a bin-empty sensor can be inadequate.

The mailbox system 10 of this example, or otherwise, is preferably provided with mode selection capability for usage of the mailbox bins 11. A number of system operating choices can be made in this mode selection process. The mode selection can be pre-installed software or hardware in the controller 100 as the unit is shipped to customers, or as installed at customer sites. Alternatively, mode selections can be provided by a systems administrator with access capability. A further alternative is to allow certain of the mode selections to be made by some or all of the users of the mailbox system, either by entry at the mailbox unit itself, as on the keypad 102 or display 104 (see FIG. 5) to reprogram or program software in the controller 100, or from remote terminals by special keyed in instructions or electronic "job sheets" options selections.

Of particular interest here is the mode selection or setting of the mailbox for determining whether print jobs for more than one user will be placed in one or more individual bins. Either the entire mailbox unit 10, or selected individual bins of a mailbox unit, can be programmed to allow either one, or more than one, addressee to have their print jobs directed to a bin. A print job addressed to a bin can be a facsimile receipt or either a remote or local (convenience copying) printer output. This mode selection of either shared or unshared mailbox bins can impact the correct estimation of the stack height and thus the remaining stacking capacity of a bin, as previously discussed. That is, where mailbox bins are shared by more than one addressee, there is a greatly enhanced increase in likelihood that one of those print job recipients will remove only part of the print jobs from the bin when accessing the bin, rather than removing all of the print jobs from the bin to clear it and make it accessible for reassignment or further use. The partial removal of sets may actually provide substantial usable further job stacking room in the bin, but it is undetectable since there is no way to determine how many or what portion of the print jobs have been removed from a bin, unless they are all removed, to clear it (which is sensed by a bin empty sensor), or unless a measurement system is provided for the direct re-measuring of the remaining stack height in the bin after such a partial removal of sheets from the bin, as is disclosed herein.

Accordingly, as will be further described herein, it has been found to be highly desirable to have a dual mode system of determining the fullness of individual mailbox bins. I.e., which desirably uses an in-bin sensor to signal at least one or two key levels of bin fullness where the bin is in a shared recipients mode, and alternatively, when the bin is one which is in a dedicated or single recipient (unshared) mode of operation or configuration, to preferably use a different mode of stack height estimation or remaining capacity estimation system. Namely, a "point count" (P count) or estimation system based on the count of the number of sheets which have been fed to that bin since that bin was last cleared, but corrected by factors affecting stacking height, such as sheet thickness and staple build-up.

The clearing of the bin is signaled by a "bin empty" sensor, as further described herein. The clearing of the bin resets the incoming sheet counter, which counts the number of sheets being or to be fed into that bin. That counter may be by an actual physical sheet sensor of a known type as schematically illustrated here by way of example at the entrance to the unit 10 in FIG. 5, shown connected by a dashed line to controller 100. Alternatively, as shown by the dashed line between the printer 14 and the controller 100 in FIG. 5, the printer associated with the mailbox may provide the sheet count for the job which is being printed or about to be printed for a designated user, which designated users' print jobs are being sent to that particular bin at that time. I.e., the bin assigned at that time to that print job.

To express this another way, there is disclosed a dual mode system to determine the bin full condition of the mailbox bins. Mode No. 1 is for the case of one assigned user per bin. In mode No. 1, the system determines the fullness of the bin by counting sheets, and this sheet counting is corrected or improved in accuracy for stack height estimation by additional calculations, with a formula taking into consideration factors affecting output stack height, especially staple build-up and/or paper thickness. A bin empty sensor is preferably located in each such bin and the signal for the bin empty sensor resets this counter correction calculation system whenever the bin is emptied.

Mode No. 2 is for the case of shared use of a bin, where, since only personal jobs may be removed by each user, partial stacks will frequently remain in the bin, and it is impractical to determine the fullness of the bin using mode No. 1 (even though mode No. 1 may be actually more accurate in some cases due to mechanical tolerances and reading errors in a physical sensor). For this mode No. 2, it is thus preferable to use a physical or direct stack height sensing system, such as the disclosed sensor arm and sensor flag actuation mechanisms. However, as taught herein, this sensor mechanism can be a single but repositionable mechanism utilized for the entire mailbox rather than one sensor per bin.

The single sensor may be moved to interrogate the bin for which the stack height is to be determined, i.e., the bin in use, by a moving carriage. To this end, there is also disclosed a system for providing a sensing arm which can extend into the bin for stack height measurement, yet which arm can be retracted to a position where it is safe from damage by movement of the carriage unit between bins or damage by the operator in removing jobs from a bin. As further disclosed herein, this single sensor mechanism can be mounted on, and utilize, the existing moving carriage provided for the sheet distribution system which is directing sheets to particular bins. Thus, no additional moving carriage or other such mechanism is required to detect bin full conditions in any bin of an array of multiple mailbox bins. A single but movable sensing system for bin fullness detection is thus provideable at relatively low cost, far less than the cost of having separate sensors in each bin. It is also much more reliable than a large number of sensors and their associated wiring, and much less subject to damage than sensors which leave their sensing arm in the bin at all times.

Furthermore, this single sensor mechanism may also be repositioned and used to control the location or stacking height of the general use high capacity stacking elevator tray in its various locations. That is, this same sensor system can be utilized as a stack height sensor when the movable carriage is parked adjacent to the elevator stacking tray or other high capacity bin instead of being parked adjacent to a normal mailbox bin.

An additional option, which could be called mode No. 3, or an exception to mode No. 2, is for controller 100 to display instructions on display 104 for any shared bin recipient to remove all print jobs, not just their own, from the shared bin(s). In that case, mode No. 1 bin fullness estimation may be used even though the bin is shared.

Note that once the bin fullness is determined, the algorithms defining the bin assignment options, and defining the handling of job overflows for full bins when it has been determined that a subsequent print job or set will not fit into a given bin (as detected by either of the disclosed dual modes of bin full detection) are already disclosed in the above-cited U.S. Pat. No. 5,358,238-see especially its FIGS. 6, 7, and 8, and its claimed subject matter.

To summarize this particular above-described mailbox bin fullness determination system again, there is disclosed a dual mode bin fullness determination system that: (1) counts the number of sheets and stapled sets deposited into a bin assigned to a single individual (or to a group that has agreed to and/or is signaled to unload the entire bin when unloading their own jobs); or (2) detects with a sensor the filled height of the stack in those bins which are assigned to more than one individual. As described, the sensor system is preferably one which uses a single sensor mechanism mounted onto a moving carriage movable past the array of bins so as to be able to detect bin full conditions in any bin in the array of mailbox bins.

To express the selectable mailbox operating modes in another manner, the system administrator can be allowed (or not allowed) to set up a mailbox system in three different possible configurations: (1) no mailbox bins are shared and print jobs for different recipients cannot be placed in the same mailbox bin; (2) some or all of the mailbox bins may be allowed to have designated addressees of more than one recipient, i.e., the bins may be shared, but partial unloading of job sets is not allowed—every user of that bin must unload everything in the bin to clear the bin whenever they access that bin; or (3) both shared bins as in (2) and also partial unloading of the bin is allowed. It is the third setup configuration of the mailbox system that prevents a stack height estimation system based on the sheets fed into that bin (such as the disclosed P count system) to correctly tell whether the bin is full or not. I.e., to correctly predict its stacking height after the partial removal of print jobs by only one or more of the shared users. In the third mode, where partial unloading of a shared bin is allowed, it may additionally be desirable to inhibit or prevent the insertion of any stapled sets into such shared bins, as will be further discussed.

Although a dual mode stack height control system is disclosed herein for mailboxes in which a point count or "P count" stacking level estimation system is not used in all cases, and an actual physical measurement of the stack height with a sensor is utilized in other cases (for shared bins in which there may be partial removal of print jobs), it will be appreciated that a P count system may also be utilized alone, where appropriate, without any physical sensors. For example, for the estimation of the stacking height in a single tray or bin, an elevator stacking tray, or a mailbox system in which bins are assigned to only one recipient per bin. That is, the advantages of this P count stacking level estimation system, with its corrective attributes for paper weight and/or staple build-up to provide a more accurate estimation of the maximum height of the stack in the tray or bin at any point or area over the top of the stack, are valuable in other applications.

The attribute or correction factor for paper weight will now be further discussed. "Paper weight" is a term which is often interchanged or utilized for sheet thickness in the art, since they are closely related. It is, of course, primarily sheet thickness that affects stack height estimations based on a count of the number of sheets being fed onto the stack, although heavier or thicker sheets are also more prone to stiff curls that can also affect maximum stack height. The sheet thickness information can be obtained by the controller 100 or other control system for the P count calculation from various sources. For example, the printer itself may have a dedicated tray or cassette which all users are instructed to load only with one particular weight or type of paper or print medium (e.g., card or tab stock only, transparencies only, or the like). This is possible because of the large number of independent paper feeding drawers or cassettes typically now provided on many copiers and printers. In this case, whenever the printing is selected from such a dedicated tray, the controller system knows that a weight attribute preset in non-volatile memory can be provided which will provide a corrective factor for the increased thickness of that special print medium as compared to conventional paper, e.g., compared to typical 20 lb. bond print paper.

Alternatively, another paper thickness attribute input system is to provide, whenever any paper tray drawer is open for reloading, that the interactive GUI display (operator touch screen entry system) will display a selection choice for entry by the operator from a display of different attributes (as is well known per se). For example, a series of questions may be displayed, with adjacent GUI touch response areas, one of which must be selected, such as "loading normal paper?", "loading card stock?", "loading transparencies?", etc. It will also be appreciated that in a remote users shared printing system that these choices may be made on the "job ticket" prepared on the terminal of the remote user, or otherwise. If no paper weight attribute is provided, then the system can assume the normal or default situation of regular weight print paper, and the corrective attribute for paper weight will be 1, i.e., non-correction.

The corrective attributes for staple build-up will almost always be available on any system providing a user input choice of stapling print jobs. Likewise similar stack height affecting attributes can be provided for user selections of glue binding, splined tape binding, cover inserts, etc., where available. These finishing options all normally require operator selection input to the system, via the printer GUI or job ticket, of a specific requirement for these special features. Thus, this information is already electronically available to the controller. The amount or degree of the corrective factor for staple or other binding build-up may be preset into non-volatile memory (NVM) in the system, or written directly into the software control code, since the finishing device will have known properties. The specific factor number may vary somewhat depending on the type of stapler or binder in that finisher. For example, a conventional fixed anvil stapler tends to leave curved staple legs with increased stacking height as compared to a stapler or stitcher with an "active clincher" for folding the staple legs flatter and with a sharper bend between the crown of the staple and the folded over legs. Likewise, heavy duty staplers or stitchers may be assigned a slightly higher stapler build-up correction factor than conventional weight staples due to their thicker staple wires. However, these correction factors are easily empirically derived as known quantities which can be stored in NVM and called upon for the subject "P count" calculation at anytime. Likewise, the number of sheets per stapled set, and the number of sets to be stapled, i.e., the number of requested copy sets, are all known in advance from the operator input or job ticket.

The following point count formula may be applied in software as sheets are fed to the mailbox. This formula is applied as the mailbox is queried as to whether it can accept more output sheets, on a sheet-by-sheet basis. In software programming, this can be called a "proposal". Each time a new sheet is "proposed", the mailbox software increments the tally of the total number of "points" for sheets already in the bin plus the number of "points" from previous "proposals" accepted but not yet having reached the bin. If this total surpasses the maximum number of allowable points "in" the bin, that bin is not considered to be a valid candidate for that sheet, and that sheet will be diverted elsewhere. When a sheet is actually delivered to the bin, the number of points in the bin tally is incremented to properly reflect the number of points actually in the bin, and the number or tally of proposed points is decremented. In this way, the mailbox tracks the total number of points existing in the bin (in nvm) and keeps an accurate count of the total of points in the bin plus points proposed for that bin.

The formula which may be followed may be expressed in C++ software code as follows:

"if (stapled &&(sheetCount<=15))
{
pointCount=smallStapledFactor*weightFactor*sheetCount;
if(endOfSet) pointCount+=stapleAddition;
}
else
pointCount=weightFactor*sheetCount;"

In this formula, small stapled sets, which have less than or equal to fifteen sheets per set, are calculated according to a different formula than unstapled sets, or sets which are stapled but have more than fifteen sheets. The small stapled sets have an additional number of points added to them in order to account for staple build-up.

In the case of either locking or non-locking bins which are assigned to a single individual, any combination of stapled and unstapled print jobs can be sent to the bin assigned to that single individual. As noted, the amount of material deposited into each bin since the last time the bin was fully emptied may be continuously tracked, using the disclosed P-count system. This information is used during the bin assignment process to allocate jobs to specific bins. If the job size is known prior to starting the job, as it usually is, calculations may be made up front to determine whether that job will fit into a given bin or how much of that job will fit into a given bin. This calculated information can be used to optimize bin utilization and enable jobs that are delivered to more than one bin to be split at better defined set boundaries. If the job size is not known ahead of time, then sheets destined for a given bin can be fed to that bin up until the calculated capacity is reached. Even in this latter case, it is important to calculate the available capacity of the given bin in advance, so that sheets are not fed into the system that cannot fit into the current bin, or determine in advance jobs that would be illogical to split since only the first part of the job could be put into that bin.

As noted, the number of sheets which can be put into a given bin depends upon the type of paper being used for or during the job to be put into that bin at that time and also on the stapling attributes of the job. Merely for purposes of an example, the bin capacity of a non-locking mailbox bin may be nominally defined as 100 "points" and the capacity of a locking bin as 75 "points". The disclosed point system may be used to define or re-define the capacity of each bin on a continuous basis to take these varying attributes into consideration. The equivalent thickness (in points) of any given job may be calculated as disclosed herein. As noted, after a bin is fully emptied, the bin empty sensor so indicates, and that signal resets the bin point counter to zero.

Further by way of example of the calculation for point counts, this may be done separately for unstapled jobs, staple jobs where the number of sheets per set is greater than 15, and staple jobs where the number of sheets per set is less than 15. The latter case of course has a much more severe staple build-up problem, since there will be far more staples in the bin with such smaller stapled sets filling the bin.

For the first case, of unstapled print jobs, the equivalent job thickness in "points" may be calculated by multiplying a paper weight component or attribute times the number of sheets in the job of that weight. As otherwise noted, the paper weight component attribute signal or input may be from a dedicated tray for special papers, operator input, or even a direct calculation of paper weight by a sheet input sensor. A paper weight sensor may sense roll separation distance of a sheet nip, or use an optical, ultrasonic, capacitive, or other known sensor to detect the approximate thickness or weight of the sheets being printed or entering the mailbox bin. This is schematically illustrated by the sensor shown at the mailbox bin entrance 13 in FIG. 5.

The values for the paper weight factor, or $K_W$, may be, for example, allocated as follows: paper weights of less than 75 gsm (grams per square meter, a standard definition) may be given a $K_W$ of 1.0. Sheets with a paper weight of 76 to 100 gsm may be given a $K_W$ of 1.5, and sheets with greater than 120 gsm paper weight may be given a paper weight of 2.7. Alternatively, if only two levels of paper weight are defined, any paper of greater than 75 gsm may be given a $K_W$ of 2.7.

If no paper weight information is provided or defined, then all paper may be given a $K_W$ of 2.7 and the effective capacity of the bins may thus be reduced from 100 sheets to 37 sheets to ensure that the capacity of the bin is not exceeded even if all of the sheets being fed into that bin are heavy sheets. If there is an intermix of different weights of sheets, for example heavy weight covers or inserts in a job of otherwise lighter weight sheets, then the number of sheets of each paper weight may be multiplied by the appropriate $K_W$ factor and those values added together to determine the equivalent job thickness in points for the total job.

Note that the "point" in this example is selected as 0.14 mm. This is the approximate thickness of one sheet of standard, conventional 20# paper, allowing for some "fluff" or curl in stacking. However, this selected nominal value assigned as one "point" is for reference only and could be different. Thus, it will be appreciated that the $K_W$ examples here may vary depending upon the nominal setting of the point level.

Turning now to the second P-count calculation situation, of stapled jobs with more than 15 sheets per stapled set, it has been found that the same calculation can be used as for unstapled jobs. That is, multiplying $K_W$ times the number of sheets per job to determine the equivalent job thickness and therefore calculate the number of jobs which can be fitted into the bin of a given preset maximum point capacity. In other words, a staple build-up factor does not need to be taken into consideration for stapled sets of greater than 15 sheets, since the added thickness of the staple is offset by the fact that the stapled area of these thicker sets is compressed by the stapling action, giving an overall thickness in the stapled area that is not greater than the thickness of the set in other areas.

Turning now to the third situation of point count calculation, for stapled jobs having less than 15 sheets per stapled set, it has been found that the desired point calculation may add 5 points to the multiple of 0.78 times $K_W$ times the number of sheets per set, and to multiply that number by the number of sets, to derive the total point count or equivalent job thickness in points.

The above or other point count systems may be utilized to much more accurately determine the utilized and remaining set stacking capacity in any given bin. This may be done not only for dedicated bins assigned to single users (who can be assumed to always unload all of the print jobs from a bin when they access it and this clear it), but also in the situation of shared users which agree to unload the entire bin when they access it. This mode may be particularly usable in the situation of shared users who are physically located near one another and would normally retrieve and distribute one another's print jobs, or where there is provided a separate off line manual mailbox or separate in baskets or holding trays for the different users of that bin.

However, as previously discussed, in the situation where bins may be assigned to shared users and it is assumed that they will not (or cannot be trusted to) unload the entire bin, and are likely to only unload their own print jobs, it may be essential to utilize a physical stack sensing system as disclosed herein in lieu of or in addition to the point count stack height estimation system described herein. Where the jobs entering the bin are unstapled, the sensor arm of the stack height sensor may be actuated every 8 sheets or so by pulsing the solenoid briefly. As noted, the pulse may be timed so that it occurs at a time which does not impede the settling of any sheets into the tray. After a preset period after the solenoid has been actuated to move the sensor arm out into the tray onto the top of the stack, the state of the sensors connected to the sensor arm may be checked by the controller 100 to see if they are blocked or unblocked. In the case where two sensors are provided, for two different arm positions corresponding to "bin full" and "bin almost full" levels, the blocking or unblocking of the sensors by the flags connected to the arm will provide signals corresponding to those conditions.

The response to the respective signals will depend on how the system is desired to be set up and the preset level of the sensors as compared to the actual bin capacity. For example, after a bin "almost full" signal has been received, the printer may be signaled to stop or pause for a bin reassignment or requisite bin unloading signal so that further sheet feeds are not provided into the mailbox system, but sheets already in the paper path may continue to the current bin. Then the current print job in progress may be either restarted and completed and sent to an alternate or "overflow" bin or other output location, or held in electronic memory. No further print jobs will be scheduled for the "full bin" until it is unloaded and a clear signal provided by the bin empty sensor.

In the alternative, to cover the situation where there has been only a partial removal of jobs from the bin, the following scenario may be utilized. If a continuous, e.g. more than 60 seconds, bin empty signal is received from a previously indicated full bin, the jobs can again be scheduled to be delivered to that bin. If only a brief bin empty signal occurs, e.g. less than 60 seconds, so that such a previously full bin appears blocked again, then the next time the carriage is either idle or scheduled to pass by that bin, the carriage may be directed to stop at that bin and conduct a bin full check with the physical sensor again, for that bin. If no bin empty signal at all has been received from the previously indicated full bin, then at a preset interval, e.g. 30 minutes, the carriage may be directed to stop and run a bin full check on that bin again the next time the carriage is either idle or scheduled to pass by that bin.

It may not be desirable to allow stapled sets to be placed in bins which are going to be shared by users who only partially remove or partially empty print jobs if the stack height sensor is of the single point contact type, as in FIG. 1, because staple build-up may not be detected, since staple build-up may occur anywhere along the bound edge and may not occur under the end of the sensing arm. Also, bin fullness can only be detected after the stapled set has been ejected into the given bin, and that may not occur until after the bin has been overfilled and become subject to jams due to staple build-up. However, even with the single point sensor of the FIG. 1 type, an alternative option is to allow stapling of jobs for the shared user bin by the bin fullness sensor detecting two different levels of bin fullness and making conservative assumptions about the number of stapled sets and therefore the staple build up. For example, the set point for the "bin almost full" level could be utilized as the trigger level of bin fullness instead in the case of shared bins and stapled sets, simply by automatically resetting that trigger point in NVM automatically at the time the bin is programmed for shared use.

Turning now to the alternative utilization of the same stack height sensing system for a high capacity bin, in particular an elevator stacking tray which may be in the same mailbox bins array or unit, it is known that such a high capacity tray surface must be repositioned vertically to accommodate maintaining the top of the stack in a proper position to support the lead edges of sheets being compiled when the compiler is of the type in which the lead edge areas of the compiling sheets project partially onto the top of the stack while being compiled, and/or to provide a proper set drop height for unobstructed stacking from the set ejection level onto the level on the top of the stack, which height changes as additional sets are ejected. The vertical drive of the elevator tray may be any of the well-known conventional vertical repositioning systems such as a rack and pinion gear system driven by a DC motor, with worm drive gear reduction to prevent coasting by gravity when power is removed, and a slip clutch to prevent overdriving against obstructions, etc. The acceleration of the tray may vary with stack size, since that affects the weight on the tray. Conventionally, an additional high capacity bin full tray sensor is positioned to trip a flag mounted on the elevator when the tray is closely approaching the bottom of its travel limit.

The operation of the elevator for its repositioning may be controlled by the same stack height sensor here normally being used for the mailbox bins, in a similar manner to that previously used for elevator trays with a separate sensor. That is, sheets may be fed into the high capacity stacking bin or tray and the stack height arm of the bin fullness sensor on the input system actuated every 8 sheets or after the completion of the ejection of a set compiled as a set and/or stapled. The "almost full" condition or trigger level of the sensor may be utilized to actuate the tray drive downwards until this sensor is unblocked, to then stop the tray, so as to control the proper stacking height. When the tray is full, this can be detected by the high capacity bin "full" sensor to stop further printing until the tray is unloaded. However, sheets then currently in the paper path may be delivered to the stacking tray, and also any set in progress may be completed up to a preset e.g., 50 sheets maximum.

As a check to see whether print jobs have been removed from the high capacity stacking tray, at preset time intervals after the high capacity bin "full" signal, the finishing carriage may be stopped again adjacent to this high capacity bin (when it is not otherwise in use), at the same level, and a subsequent recheck with the stack height sensor may be made by again extending the sensor arm into the stacking tray to see if it is still full. If the "full" sensor is no longer then blocked, jobs can again be scheduled for this high capacity bin and/or previously interrupted jobs can be completed.

If stapled sets are being fed to the high capacity bin, and the stack height sensor is of the single point contact type as in FIG. 1, then the prior art system of limiting the output to a preset maximum number of stapled sets, e.g. 30 stapled sets, may be provided in NVM, to make sure that staple build-up "fooling" that type of sensor does not become a problem. However if this preset number of stapled sets limit is not reached during a staple job being inserted into the high capacity bin, then the bin full determination may continue in the same manner as described above.

Turning now further to the disclosed examples of bin full and/or bin-almost-full condition determination sensing systems, in the FIG. 1 example of a system 12, a bin full and bin almost-full bin stack height sensor 12a is triggered when the stack height of the sheets in that bin being sensed reaches, respectively, preset almost-full and full levels, schematically illustrated here by respective phantom line levels in the bin 11. The almost-full level may be e.g., approximately 10 to 20 (normal) sheets from the full or maximum desired stacking capacity of that bin, e.g., 50 normal sheets. This "almost-full" condition or level trigger point of the sensor 12 is shown here by the phantom line 12b in the bin 11. This stacking level is sensed here from the position of the sensor 12a operative arm 12c end 12d resting on top of the stack of sheets in the bin 11. A bin full level phantom line 32 thereabove illustrates the preset maximum desired stacking level in that bin 11, and the actuating level of the bin full sensor, which in this example is provided by a second and higher level switch point of the sensor 12$a$, as will be further described. This particular example of sensor 12$a$ has two integral switches or switch positions, so as to provide two different signals; one signal at the almost full level 12$b$, and another signal as the stack height in that bin reaches the bin full level 32. Both are respectively actuated by respective positions of the switch arm 12$c$ as the bin 11 fills if that bin is filled with print jobs to that extent. That switch actuation may be by the conventional breaking of the light beam of a conventional optical switch by the arm flag passing therethrough. Two adjacent flags or two portions of one flag may be provided to actuate the switches.

A linear spring, as shown, with a relatively low spring force, may be connected between the actuating solenoid and its connection to an extension of the arm 12$c$, so as to hold down the arm end 12$d$ with a corresponding limited gentle normal force against the top of the stack in the bin in its stack height measuring positions. Another, torsion, spring may be provided on the pivot mounting shaft of the arm 12$c$ to return the arm 12$c$ to an unobstructive upright position whenever power is removed from the solenoid. An arm stop 12$e$ may also be provided for that arm position. Here that is the shaft of the lower sheet input roller. The stop 12$e$ holds the arm 12$c$ in a position completely out of the paper path, for completely unobstructed sheet movement.

For wiring convenience and cost reduction, the bin-empty sensor 40 may be mounted to or integral the same sensor unit, although a separate signal is provided. Here the bin-empty sensor 40 is optical, looking up through an aperture in the overlying bin to which it is mounted to the next sensor 40 above that bin, and thus indicating if there are any sheets therein obstructing the light beam path therebetween.

Figure 2:
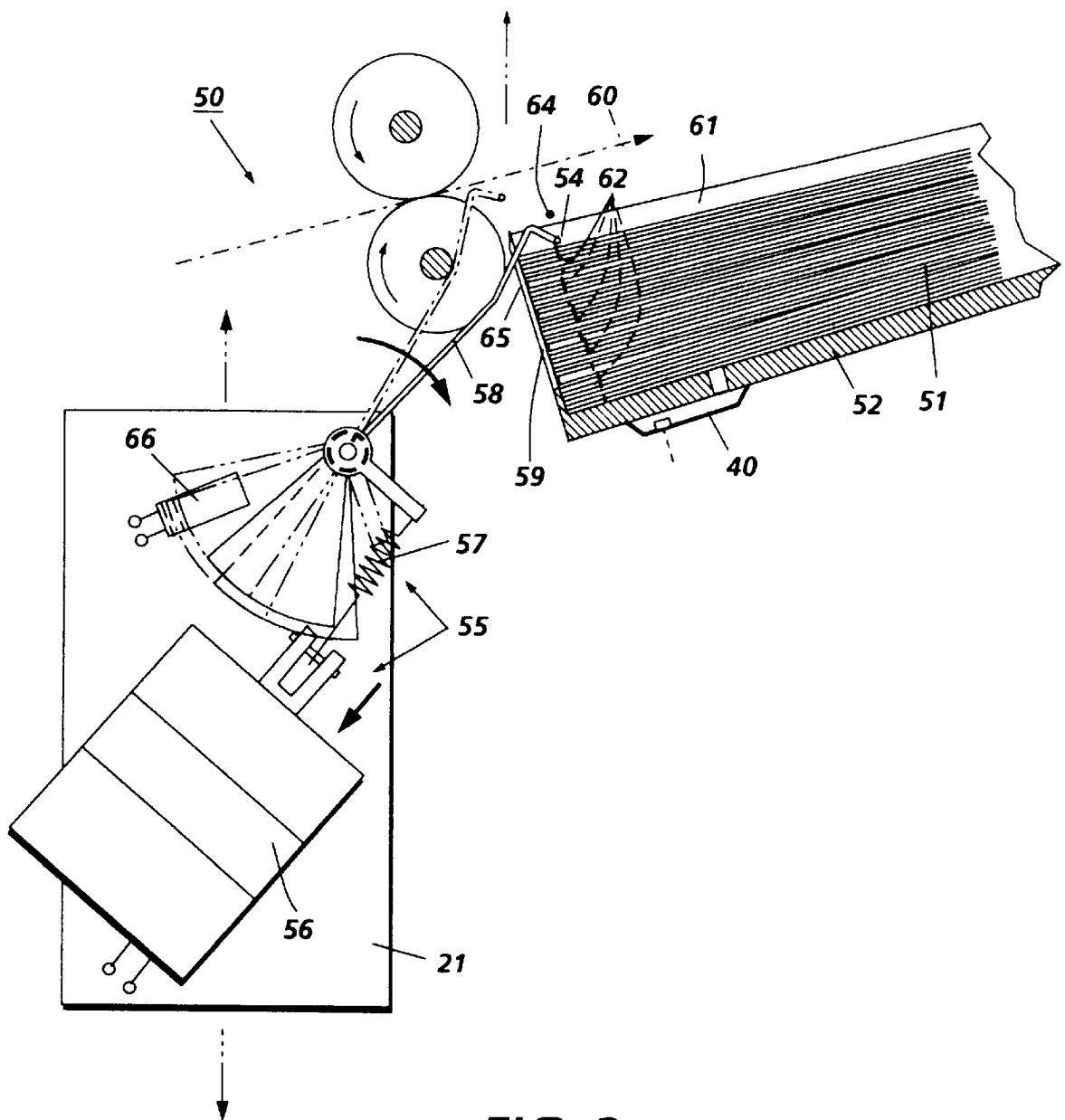
Figure 3:
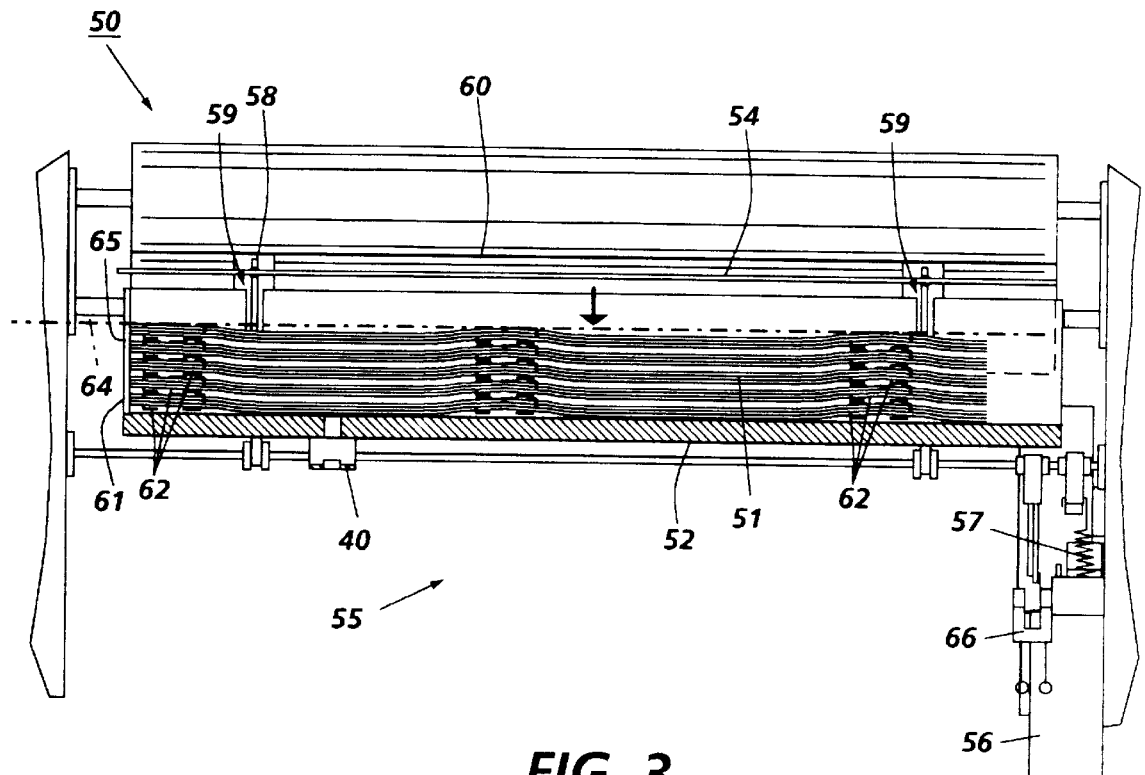

The stack height sensor system embodiment 50 of FIGS. 2, 3, and 4 discloses an improvement in in-bin maximum stack height sensors for stacking trays in general, which is suitable for, but not limited to, use in mailbox systems with mailbox bins 11 as in the example 10 of FIG. 5, as further described elsewhere herein. Instead of a single point contact with the top of the stack 51 in the bin 11 by the sensing arm, there is a full width maximum stack height sensing bar 54 (see especially FIGS. 3 and 4) which sensing bar 54 may be briefly brought down onto the stack, as in FIG. 4, when a measurement is requested, by a movement system 55. This will be before or in between sheet feeds into the tray or bin, and may also be at preset intervals of time or numbers of sheet feeds. Here, this movement system 55 is provided by electrically activating a solenoid 56, which, via intermediate normal force limiting spring 57, pivots a pair of arms 58 carrying bar 54 on their ends into the bin 11 or tray onto the top of the stack 51 for measuring stack height adjacent the sheet entrance path 60 to the stack 51 in the tray or bin. The arms 58 may so move through corresponding vertical slots 59 in the vertical front registration wall of the bin 11 as shown. The linear spring 57 connected between the actuating solenoid and its connection to an extension of the arm has a relatively low spring force, so as to hold down the arm end with a corresponding limited but relatively gentle but normal force against the top of the stack in the bin in its stack height measuring positions, which normal force, however, is sufficient to induce top sheet settling.

Whenever power not applied or is removed from the solenoid 56, the arms 58 and the attached bar 54 automatically pivot up and away from the stack and unobstructively out of the sheet entrance path 60. I.e., the bar 54 and its supporting arms 58 are effectively moved out of the bin 11, or at least out of the stacking area thereof. This may be into the position of an arm stop into which the arm is so pivoted. Here in this example that arm stop is the shaft of the lower sheet input roller. A conventional spring, such as a torsion spring on the pivot mounting shaft of the arm, may be used to return the arm to an unobstructive upright position whenever power is removed from the solenoid, and/or this may be done by gravity by weighting the arm on the other or inside of its pivot point. It may be seen that this parked or normal non-measuring position of the sensing bar 52 and its mounting and moving arms 58 is well below the nip 68 of rollers 69 defining the sheet feed-in path 60. An arm stop 12$e$ may also be provided for that arm position. The stop 12$e$ holds the arm 12$c$ in a position completely out of the paper path, for completely unobstructed sheet movement.

Whenever a power pulse is applied to the solenoid 56, very shortly thereafter the bar 54 will come to rest on top of the high point of the stack 51, and at that time its position may be checked or measured. Thus, bin fullness checking can be done on a substantially continuous basis if desired. The elongate sensing bar 54 desirably extends laterally across the entire stack 51, and thus across both of the potential edge curl locations and side registration edge 61 sheet hangup locations. It also preferably overlays all the potential staples 62 staple buildup areas, by being positioned in a measurement position which is along the set stapling positions line 64, which here is adjacent to and parallel the front stack registration wall having the slots 59. Thus, the sensor system 50 can much more accurately detect the highest point on the stack, in the sheet entrance path 60 to the stack. By this sensing bar 52 extending out to the stack edges, and having a controlled normal force, it can also to provide sheet settling assistance, especially for lightweight sheets hanging up on side guides. This can be assisted by notches or cutouts 65 in any side registration edge such as 61 of the tray or bin 11, allowing ends of the sensing bar 52 to extend therethrough, as shown.

The position of the bar 54 may be signaled by electrical signal(s) from a conventional positional sensor or sensors 66 sensing the position of the inner end, or an extension of, the connecting arm 58, which signals are connected to a controller 100 as in FIG. 5, or otherwise. These signals can be used to prevent, limit or redirect further sheet feeding into the tray or bin 11 based on the measured maximum stack height of the stack in the bin at the time of measurement, and its comparison to a preset desired full and/or almost full stacking level, well below the level at which a sheet input feeding jam or interference could occur, as described elsewhere herein, or otherwise. For mailbox systems, that function is further explained herein and in the cited patents thereon. The sensor(s) 60 may actually be two or more separate sensors or switches for two or more flags or different positions of the flag or other angular position indicator on or for the arm 58. For example, for separate bin full signals and bin almost full signals, which bin almostfull signal is triggered for a stack height a number of sheets lower than the bin full trigger level. Or, the sensor 60 could be a continuous positional sensor such as a rotary encoder connected to an arm 58. This particular example of a sensor 60 has two integral sensors and two flags, so as to provide four different detection levels, i.e., 00, 10, 01, and 11; one signal at the almost full level, one signal at the high capacity bin (HCB) compiling level, one at the HCB set eject level, and one at the HCB stacking level; or, "bin full", "bin almost full", and two others from the list above. Both sensors are respectively actuated by the flags by the respective positions of the switch arm as the bin 11 fills, if that bin is filled with print jobs to that extent. That switch actuation may be by the conventional breaking of the light beam of a conventional optical switch by the arm flag passing therethrough. Two adjacent flags or two portions of one flag may be provided to actuate the switches.

All of the stack height sensor systems disclosed herein may be designed so that vertical slots as illustrated in the registration end wall of each of the bins 11 allows the stack sensing arm to extend into any of the bins 11 and move down to touch the top of the stack therein.

The sensor trip point for providing a "bin full" signal is appropriately set to somewhat less than the actual full condition of the bin. For example, the sensor trip point may be set to approximately 20 sheets from full, assuming standard 75 GSM paper. However, as noted, the bin capacity for non-locking bins may be set higher than the capacity for a locking bin and of course will be much different from that of a high capacity elevator or other stacking tray.

Figure 9:
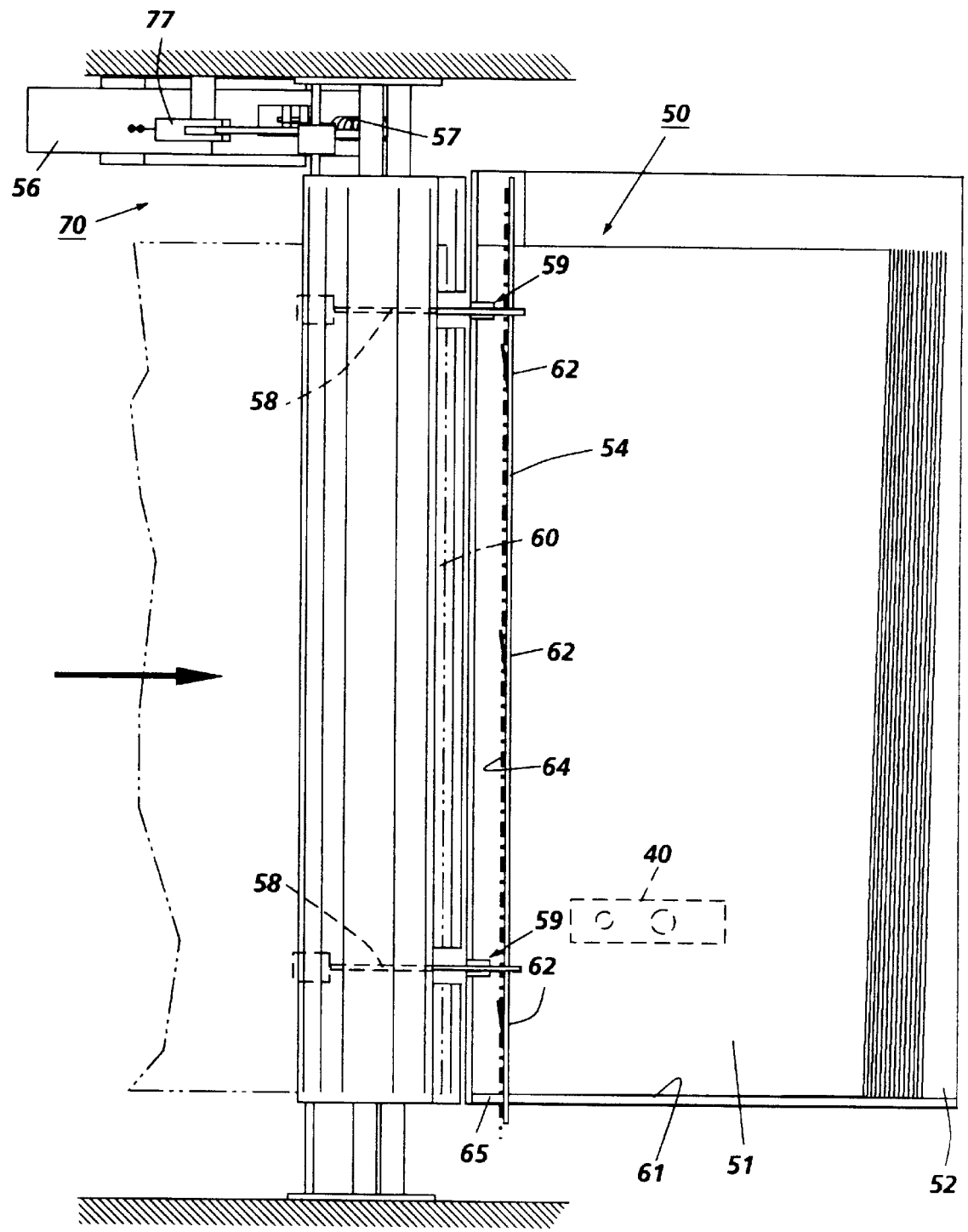
FIG. 9 is a top view of the embodiment of FIGS. 2, 3, and 4.

Turning now to the third embodiment 70 of FIGS. 8 and 9 of a stack height measurement system which may be used for a bin fullness or almost full sensing in a selected array of sheet stacking bins, particularly a mailbox system, this system 70 utilizes optical sensing. Specifically, a pair of arms 72 and 74 may be commonly pivotally mounted on a single shaft or otherwise moved in parallel. The outer or operative end of one arm 72 contains an LED 75 IR or other light source, aimed at a light sensitive receiver or sensor 76 of conventional type in the operative outer end of the other arm 74. The latter may be connected to the controller 100 of the mailbox unit 10 in a manner similar to the other embodiments here. The two arms 72 and 74 may be mounted to pivot in and out of the bin 11 or other tray at opposite sides thereof, outside of the registration end wall of the tray, as shown, or pivoting through slots in the end wall. In either case, the arms 72, 741 and the respective sensor source 75 and receiver 76 in the arms, are desirably spaced apart by a distance greater than the width of the stack in the tray or bin. As the two arms pivot down in unison, the light beam therebetween is broken, to signal the stack height position, at the highest stack point along the light beam path. By arranging this light beam to be in the sheet input path, this system can also detect peaks or curl along the top of the stack of the paper in the bin. However, there is no sheet "knockdown" or normal force function, such as a physical arm or bar provides, as in the embodiment in FIGS. 2, 3, and 4. However, one advantage of the system 70 is that there is nothing in the paper path or tray to interfere with or obstruct sheets being fed into or stacked in the tray, only a light beam.

With the system 70, a rotary or linear solenoid can pivot the arms 72 and 74 into the tray area whenever a stack height measurement is required. An integral, as here, or other arm rotation sensor 77 may be provided to sense the rotational position of the arms 72 and 74 in their position when the light beam between them is first broken. This sensor 77 may be something similar to the sensors in the stack height sensing system 50, e.g., arm positional sensor 66 of FIGS. 2, 3, and 4, or the similar sensors 12a of the embodiment of FIG. 1. As another alternative, the LED 75 and light sensor 76 could be a conventional integral pair, in a single arm, and a spectral reflective or mirror surface provided in a side guide or other vertical wall member at the opposite side of the tray or bin. Since this system moves into and out of the bins, it can be used to detect the stack height in a plurality of bins, unlike other beam systems previously used on the above-noted Xerox "9900" duplicator and IBM series III finishers that only function with a single tray.

The exemplary disclosed bin "full" and/or "almost full" sensors can be various embodiments of a suitable in-bin stack height sensor providing the desired described functions or features. They should avoid undesirable features such as switch arms that can become bent by incoming sheets, or paper jam removals, or be subject to errors from paper lint or torn paper scrap blockage. The actuating arm should resist sheet or operator damage, but have no, or low, resistance to sheet entry into the bin or job sets removal from the bin. If desired, the stack engagement end of the actuating arm may have a freely rotatable roller or ball. However, by removing the sensor actuating and sensing arm from the sheet entrance path and stacking area of the bin or tray entirely except during a brief stack height sensing time period, as disclosed herein, the above dangers are greatly reduced if not eliminated.

While the stack height sensing system examples disclosed herein show an extension or flag on the inside of the pivot point of the operating arm conventionally actuating (by interrupting) a conventional optical sensor pair by passing between the light emitter and detector of the pair, it will be appreciated that other sensors can be used. For example, the sensor arm could be connected to a conventional rotary shaft encoder, which could give digital signal or code indications of the sensing arm position at any angle, and thus at any stack height, rather than being limited to only one or two signals corresponding to only a full or almost full position of the stack level in the bin. Alternative known systems include flags with different aperture patterns or cutouts at different degrees of rotation to provide different digital signals at different angular positions, or variable resistors whose resistance varies with rotation to provide an analog signal corresponding to the arm position. If such a continuous or multi-position signal is provided, then the stack height sensing system can interrogate the bin or tray to more accurately indicate the remaining sheet or stapled set capacity of the bin at any stacking level, and with partial removals.

As previously noted, the disclosed sensing systems can interrogate the bin or tray at any desired time. Preferably this is done by inserting the sensing end of the arm or sensing bar into the tray briefly by a relatively short time period signal applied to the solenoid which rotates the arm into that position. This is done when there is no incoming sheet or set which would obstruct or interfere with the sensor arm movement onto the top of the stack, or vice versa. The controller 100 and the conventional paper path sensors in the mailbox and/or signals from the connecting printer are available in the controller 100 to tell when the bin or tray will thus be free to be accessed by movement of the stack height sensing element into the bin. In the case of a stack of sheets which are being compiled in an adjacent compiler which are partially extending into the bin, the controller is also sensing and tracking that event and can initiate the stack height sensing after the ejection of the compiled set fully into the bin. Likewise, when individual sheets are being sequentially fed into the bin, and assuming that physical stack height sensing is desired, this can be done in an integral or pitch in between the sheets being fed into the bin. As soon as the measurement is taken, the sensing element is retracted into its normal position, which, as indicated, is unobstructively out of the paper path. The measurement does not need to be taken after every sheet or set. It can be at preset plural sheet input count intervals, and whenever a bin is initially accessed for use. Because the controller 100 will normally know into which bin further sheets will be directed by the sheet distribution system of the mailbox system, the carriage can be moved to that next bin to be used, and the stack height sensor system actuated to measure or detect the remaining capacity or fullness of that bin before the first sheet or set arrives in that bin.

As an optional feature, the "bin full" and/or "bin almost full" condition signal may be desirably used to generate a display instructional signal via controller 100 to the terminal 15 of the assigned user of that bin, allowing that user several options when that user attempts to electronically send another print job to his or her assigned bin. Among the options that could be provided to the user are: (A) display a message instructing the user to go to the mailbox and empty the bin or remove enough sheets from it until the "almost-full" condition (signal) disappears, and then print a job, or the rest of a job; (B) at the user's request (job instruction key or mouse entry), split the job or jobs between the user's assigned bin and the overflow tray; and/or (C) at the user's request, send the entire job to a different output such as the overflow tray 11a, or another unutilized, unassigned, bin 11, or the printer's own separate output tray, or a finisher, if the printer has an output tray or finisher output in addition to the mailbox output.

If the user ignores or overrides a displayed instruction to empty or remove sheets from a bin with an actuated "almost-full" sensor, and chooses to continue to send the print job(s) to the same "almost-full" bin anyway, if the print job is small (e.g., less than approximately 15 sheets) the printer may try to feed it into the "almost full" bin, with the assumption that there will be enough room in the bin for the entire job. However, if there is not enough room in that bin for feeding in the rest of that print job, and the "bin-full " sensor is actuated, the print job can be split between the user's assigned bin 11 and a newly assigned bin 11 or the overflow tray 11a, or another only partially filled bin, and the user is then informed of that automatically through a message. This option can also be used as a default in the case where the "bin-almost-full" condition is reached in the middle of a large job that will not all fit in the bin. However, if there is a "bin-full" signal for the bin, or the "bin-almost-full" condition exists prior to sending larger job to the printer for printing, then by default the entire job may be redirected to the selected alternate output area, such as the overflow tray, another unutilized unassigned bin, or the printer's output tray, while informing the user.

While it may be normally undesirable to split any job between two different output areas automatically by default, if the "bin-almost-full" condition exists prior to sending a print job, the user can be given the option to select to split the job between his or her assigned bin and the overflow tray or other output. This user option will provide the user with greater flexibility in the use of the printer to accomplish maximum productivity. And since the user will be automatically told where the different sections of that job reside if it is so split, this will minimize the confusion that can otherwise result from splitting a print job.

A significant advantage of an "almost full" bin sensor system is that it covers or protects the situation in which a user pulls out only part of the jobs from his or her bin but leaves the rest of the sheets in the bin. A "bin-empty" sensor would not be activated in that case. That situation will not fool or confuse the "almost-full" sensor when it is subsequently interrogated by the controller 100. Nor will it be fooled if the bin is first fully emptied but then the user reinserts part of its content back into the bin.

To express some "almost full" system options in other words, each of the shared user printers mailbox user bins 11 (except for the higher capacity overflow bin 11a) will desirably have an "almost full" bin sensor signal that will be triggered when the stack height of the sheets in that bin reaches approximately 10 to 20 sheets from the preset full or maximum capacity of the bin. This "almost full" signal can be automatically used by the controller 100 as described, and/or sent back over the system network in a known manner to the terminal 15 of the user of that bin when that user attempts to electronically send another job to his or her assigned bin. The user's terminal would then preferably: (a) display a message instructing the user to go to the shared printer and remove the sheets from that "almost full" bin; (b) if the user does not do so, and sends the next job to the "almost full" bin anyway, then (c) if it is a small job, it will go into that same bin until the bin actuates the "completely full" sensor in the bin, but if (d) the job size of the new job exceeds the total available or "full" space in the "almost full" bin, that entire job will then be directed to the overflow tray, so as not to split the job. As noted, the "bin almost full" status signal is desirably in addition to, and in cooperation with, "bin empty" and "bin not empty" signals for each bin. It will be apparent that other options will be available with the information sources and signals provided.

As noted, the entire operation of the exemplary mailbox module unit 10 here may be controlled by an integral conventional low cost microprocessor chip controller 100, conventionally programmable with software for the operations described herein. Such a system has ample capability and flexibility for the functions described herein, and also for various other functions described herein, if desired, such as jam detection and jam clearance instructions. Also, various means, systems and software for document generation, networking and printer control and interaction are described in above cited patents and other publications, including commercially available software, and need not be described in detail herein.

As discussed above, a shared user printer output job can be generated and sent to a mailbox unit from various sources. For example, a user can send a job to a printer from their respective workstation, e.g., from a screen display menu or job ticket. Another potential job source is a facsimile document or message addressed or directed to that printer, preferably with a designated recipient's mailbox or other user code number sent with the fax message. The print server or mailbox unit can also then send an acknowledgement message to the designated recipient's workstation. A print job can also be sent to another person's printer and mailbox bin directly, without going to their workstation, by other system users or by intra-systems electronic mail. Furthermore, a print job addressed to a particular recipient or addressee may have different final assigned mailboxes in different locations. For example, the network or printer controller may be temporarily or semi-permanently programmed to electronically store and/or forward print jobs to another printer and mailbox in that or other locations for that user or designated additional (e.g., copies) recipients, as is known for facsimile per se systems. The system may also be programmed so that print jobs for that designee default to either locked or unlocked bins, and/or bins shared with other users. I.e., it is possible to set up systems to allow either senders (addressors) and/or receivers (addressees) to control the printer and mailbox bin destination(s) of the print job before or when it is to be printed, as well as other properties of the ultimate print jobs, such as the paper, finishing, covers, banner sheets, color, number of copies (number of sets) etc. It is also known for the network system to automatically divert or switch print jobs from one printer to another when the initially selected or default selected printer and mailbox is full, jammed, out of paper or too busy (too long a print queue), or otherwise not then available; or when the initially selected or default selected printer and mailbox lacks a desired job feature such as a desired paper, font, finishing, printing capacity or printing speed, adequate numbers of mailboxes, or whatever.

It will be appreciated that many additional user option selections, and instructions for such selections, and other user instructional information, may be provided and automatically displayed. For example, users may be instructed to remove all sheets in a mailbox bin, and/or to not manually insert covers or other insert sheets into a bin unless a "stop print", pause, bin reassignment, or insert mode instruction is entered, to avoid a jam if further sheets are to be fed into that bin, or to remove sheets left for too long a time in bins.

Although it is not normally desirable to put different users jobs in the same mailbox bin 11, the bin almost full system can be used to avoid a printer 14 shutdown in the event that no bins are empty, because the system messages to the users to remove their print jobs from their bins have not been answered in time to fully free up any bin. Under those circumstances, if the bin almost full system indicates that there is still some stacking room in at least one bin, another users printjob or fax can be placed therein, if it is not too many pages, or at least the first part thereof. Offsetting and/or a separate automatically inserted or interposed banner or cover sheet can be used for job separation from the other users print jobs in that bin, and a special network message will be generated telling both users that they must access that same bin. To express that in other words, an alternative utility for the systems disclosed herein would be to provide, in a paper discharging system, for example those disclosed in the abovecited mailboxing systems patents), with plural trays for receiving recording sheets discharged from an image forming apparatus, with a user registration system for registering a recipient of the recording sheets discharged into a particular tray corresponding to a registered recipient selected by a tray selection system, and a reset system for deleting the recipient registration for that tray when that tray is fully emptied of sheets, as sensed by a tray empty detection system, the additional feature that when no available (empty) trays are detected or signaled by the tray empty detection system the tray selection system can optionally direct the recording sheets to a tray which is less than full, as determined by a system for determining that a tray is less than full, such as is disclosed herein.

While the embodiments disclosed herein are preferred, it will be appreciated from this teaching that various alternatives, modifications, variations or improvements therein may be made by those skilled in the art, which are intended to be encompassed by the following claims:

What is claimed is:

1. In a sheet stacking system with an array of plural sheet stacking bins with sheet entrances for stacking plural flimsy print substrate sheets from a printed sheets output path into selected said sheet stacking bins, including a sheet feeding input path system for feeding selected said sheets into a selected said sheet stacking bin to be stacked therein, and further including a bin fullness indicator system for indicating that the estimated height of the stack of said sheets stacked in a said sheet stacking bin has reached a preset allowable maximum, and further including a stacking control system controlled by said bin fullness indicator system to control said sheet feeding input path system for said bins; the improvement comprising:

a single stack height sensing system for respective measurements of the actual stack height of the stack of said sheets stacked in respective ones of said array of plural sheet stacking bins to provide said bin fullness indicator system;

a movable carriage system for moving said single stack height sensing system from adjacent to one said bin to adjacent to another said bin for said respective measurements of the actual stack height of the stack of said sheets stacked in said respective bins;

said stack height sensing system including a stack height sensor which moves with said movable carriage system;

said stack height sensor including at least one movable sensing element mounted to be extended into a said bin adjacent to said movable carriage system to detect the stack height of the stack of said sheets stacked in said adjacent bin, and a signal generator responsive to said sensing element to provide control signals to said stacking control system.

2. The sheet stacking system of claim 1, wherein said stack height sensor movable sensing element is movably mounted to said carriage system with a retraction system to be normally automatically retracted so as not to interfere with said movement of said movable carriage system from adjacent to one said bin to adjacent to another said bin.

3. The sheet stacking system of claim 1, wherein said stack height sensor sensing element is pivotally mounted to retractably pivot outside of said array of sheet stacking bins.

4. The sheet stacking system of claim 1, wherein said movable carriage system moves substantially parallel to said sheet entrances to said array of sheet stacking bins.

5. The sheet stacking system of claim 1, wherein said movable carriage system is part of said sheet feeding input path system for feeding selected said sheets into a selected said sheet stacking bin to be stacked therein.

6. The sheet stacking system of claim 1, wherein said movable carriage system includes a compiling and stapling system for compiling and stapling sets of said printed sheets to be fed into an adjacent said bin.

7. The sheet stacking system of claim 1, wherein said array of a sheet stacking bins includes at least one high capacity adjustable height sheet stacking elevator tray, and said stack height sensing system alternatively measures the height of the sheets stacked in said elevator sheet stacking tray to control said adjustable height sheet stacking elevator tray.

8. The sheet stacking system of claim 1, wherein said array of a sheet stacking bins is part of a mailbox system in which bins are assigned to different users, and in which different numbers of said sheets are fed to different selected said bins by said sheet feeding input path system, wherein a maximum allowable sheet stacking height is preset for said sheet stacking bins, and wherein said stack height sensing system is automatically moved by said movable carriage system to adjacent to the selected said bin into which further sheets are to be fed by said sheet feeding input path system to measure said preset maximum allowable sheet stacking height of the stack of sheets in that bin.

9. The sheet stacking system of claim 8, wherein said movable carriage system is part of said sheet feeding input path system for feeding selected said sheets into a selected said sheet stacking bin to be stacked therein, and wherein said movable carriage system also includes a compiling and stapling system for compiling and stapling sets of said printed sheets to be fed into the adjacent said bin.

10. The sheet stacking system of claim 8, wherein said movable carriage system moves substantially parallel to said sheet entrances to said array of sheet stacking bins, and wherein said stack height sensor movable sensing element is movably mounted to said carriage system with a retraction system to be automatically moved out of said adjacent bin when said movable carriage system is moving said single stack height sensing system from adjacent to one said bin to adjacent to another said bin.

11. In a shared users multiple bin mailboxing system adapted to receive plural print jobs of plural sheets for plural different recipients stacked in individual print job storage mailbox bins, said mailbox bins being electronically assignable to different respective recipients, and said mailbox bins having a limited preset maximum sheet stacking capacity, and said mailboxing system further having a sheet distribution system for automatically variably directing and stacking into different individual said mailbox bins the respective plural print jobs of different recipients, and further including a bin fullness indicator system for indicating that the number or height of the stack of said sheets stacked in a said sheet stacking bin has reached a preset allowable maximum, and further including a stacking control system controlled by said bin fullness indicator system to control said sheet distribution system for said bins; the improvement comprising:

a single stack height sensing system for respective measurements of the actual stack height of the stack of said sheets stacked in respective ones of said array of plural sheet stacking bins to provide said bin fullness indicator system;

a movable carriage system for moving said single stack height sensing system from adjacent to one said bin to adjacent to another said bin for said respective measurements of the actual stack height of the stack of said sheets stacked in said respective bins;

said stack height sensing system including a stack height sensor which moves with said movable carriage system;

said stack height sensor including at least one movable sensing element mounted to extend into said bin adjacent to said movable carriage system to detect the stack height of the stack of said sheets stacked in said adjacent bin, and a signal generator responsive to said sensing element to provide control signals to said stacking control system.

12. The shared users multiple bin mailboxing system of claim 11, wherein said single stack height sensing system provides plural different output signals for different levels of said movable sensing element to additionally provide a separate bin almost-full signal when the sheet stacking level sensed by said sensing system in the respective individual said mailbox bin passes a preset almost-full level which is less than a preset maximum stacking capacity of that bin, which preset almost-full level will allow a known preset additional number of sheets to be directed to that same individual said mailbox bin by said sheet distribution system to be stacked into that bin by said stacking control system.

13. The shared users multiple bin mailboxing system of claim 12, wherein said stacking control system, upon receiving said bin almost-full signal, determines if the subsequent print job would exceed said preset limited further number of said printed sheets, and if so controls said sheet distribution system to direct at least part of said subsequent print job to a different said mailbox bin.

14. The shared users multiple bin mailboxing system of claim 11, wherein said stack height sensor movable sensing element is movably mounted to said carriage system with a retraction system to be automatically moved out of said adjacent bin when said movable carriage system is moving said single stack height sensing system from adjacent to one said bin to adjacent to another said bin, by being normally retracted from any said bin and only briefly intermittently moved into said adjacent bin for said stack height sensing.

15. The shared users multiple bin mailboxing system of claim 11, wherein said movable carriage system is part of said sheet feeding input path system for feeding selected said sheets into a selected said sheet stacking bin to be stacked therein.

16. The shared users multiple bin mailboxing system of claim 11, wherein said movable carriage system includes a compiling and stapling system for compiling and stapling sets of said printed sheets to be fed into an adjacent said bin.

17. The shared users multiple bin mailboxing system of claim 11, wherein said stack height sensing system includes an actuator system to briefly extend said stack height sensor sensing element into an adjacent said bin for checking the stack height in said bin at periodic intervals which will not interfere with sheet stacking in said bin.

\* \* \* \* \*